(12) United States Patent
Masugi et al.

(10) Patent No.: US 7,889,866 B2
(45) Date of Patent: Feb. 15, 2011

(54) INFORMATION LEAKAGE PREVENTION APPARATUS AND INFORMATION LEAKAGE PREVENTION METHOD

(75) Inventors: Masao Masugi, Tokyo-to (JP);
Masaharu Sao, Tokorozawa (JP);
Yoshiharu Akiyama, Tokorozawa (JP);
Hiroshi Yamane, Tokorozawa (JP);
Tetsuya Tominaga, Kodaira (JP)

(73) Assignee: Nippon Telegraph and Telephone Company (JP)

( * ) Notice: Subject to any disclaimer, the term of this patent is extended or adjusted under 35 U.S.C. 154(b) by 971 days.

(21) Appl. No.: 10/592,717

(22) PCT Filed: May 24, 2005

(86) PCT No.: PCT/JP2005/009431
§ 371 (c)(1),
(2), (4) Date: Sep. 13, 2006

(87) PCT Pub. No.: WO2005/114902
PCT Pub. Date: Dec. 1, 2005

(65) Prior Publication Data
US 2009/0013205 A1 Jan. 8, 2009

(30) Foreign Application Priority Data
May 24, 2004 (JP) .............................. 2004-153662

(51) Int. Cl.
*H04K 1/02* (2006.01)
*H04L 9/30* (2006.01)
(52) U.S. Cl. ........................ 380/252; 713/189; 713/190; 713/191; 713/192; 713/193
(58) Field of Classification Search .................. 380/252
See application file for complete search history.

(56) References Cited

U.S. PATENT DOCUMENTS 4,932,057 A 6/1990 Kolbert (Continued)

FOREIGN PATENT DOCUMENTS

GB 2333883 8/1999

(Continued)

OTHER PUBLICATIONS

Wim Van Eck, Electromagnetic Radiation from Video Display Units: An Eavesdropping Risk, Slsevier Science Publishers B.V., 1985, pp. 40-57, Leidschendam, The Netherlands.

(Continued)

*Primary Examiner*—Longbit Chai
(74) *Attorney, Agent, or Firm*—Kilpatrick Townsend & Stockton LLP

(57) ABSTRACT

A clock signal extractor (11) is connected to an interface of an information equipment (2) for processing an information signal, to extract a clock signal component from the information signal. A clock signal generator (12) generates a pseudo clock signal having an optional phase difference relative to the clock signal component extracted by the clock signal extractor (11). A prevention signal generator (13) generates, based on the pseudo clock signal generated by the clock signal generator (12), a leakage prevention signal having an electromagnetic wave strength stronger than electromagnetic waves leaking from the information signal. A prevention signal output unit (14) outputs the leakage prevention signal generated by the prevention signal generator (13).

25 Claims, 19 Drawing Sheets

U.S. PATENT DOCUMENTS

| | | |
|---|---|---|
| 4,965,606 A | 10/1990 | Merkel |
| 5,157,725 A | 10/1992 | Lindholm |
| 5,165,098 A | 11/1992 | Holvik |
| 5,297,201 A | 3/1994 | Dunlavy |

FOREIGN PATENT DOCUMENTS

| | | | |
|---|---|---|---|
| JP | 58-034641 | | 3/1983 |
| JP | 60-245388 | | 12/1985 |
| JP | 04-504639 | | 8/1992 |
| JP | 05-151114 | | 6/1993 |
| JP | 06-083296 | | 3/1994 |
| JP | H06-175595 | | 6/1994 |
| JP | 06-214750 | | 8/1994 |
| JP | H08-008792 | | 12/1996 |
| JP | 09-023211 | * | 1/1997 |
| WO | WO 90/09067 | | 8/1990 |

OTHER PUBLICATIONS

Electromagnetic Eavesdropping Machines for Christmas?, pp. 59-62, Slsevier Science Publishers B.V., Computers and Security, Leidschendam, The Netherlandsvol. 7, No. 4.

Markus G. Kuhn and Ross J. Anderson, Soft Tempest: Hidden Data Transmission Using Electromagnet Emanations, pp. 65-82, University of Cambridge, Computer Laboratory, New Museums Site, United Kingdom.

Office Action mailed Jul. 13, 2010, Japanese Patent Application No. 2006-513759.

Office Action for corresponding Japanese Application No. 2006-513759, mailed on Apr. 13, 2010.

* cited by examiner

FIG. 7
PRIOR ART
(a)
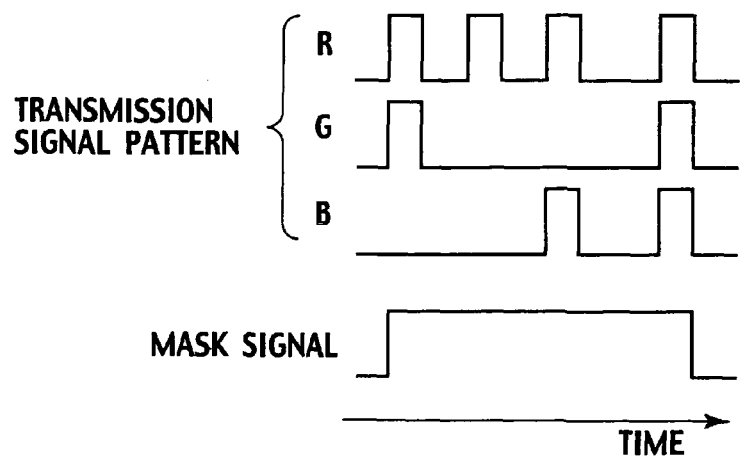
(b)
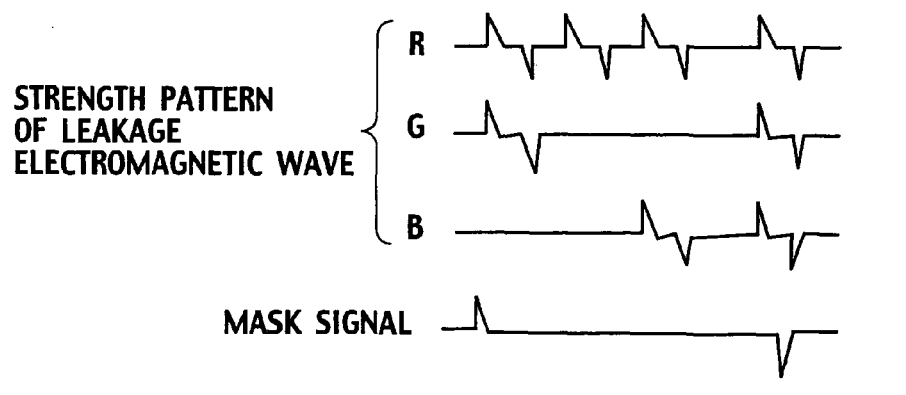
(c)
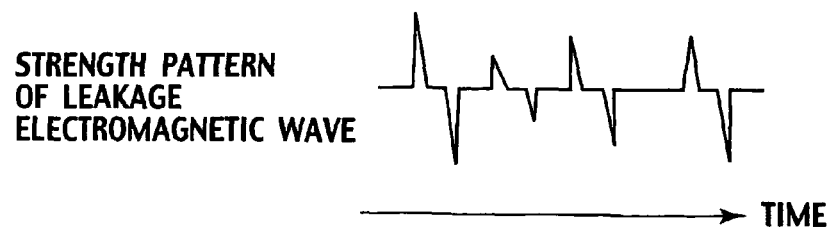

DELAY BY RANDOM NUMBER

FIG. 16
(a)
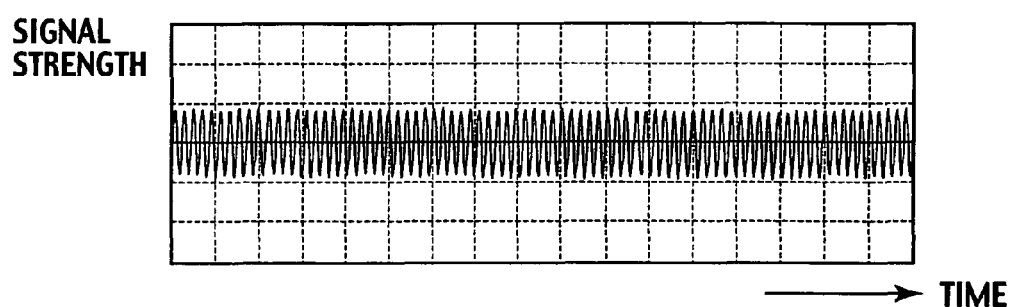
(b)
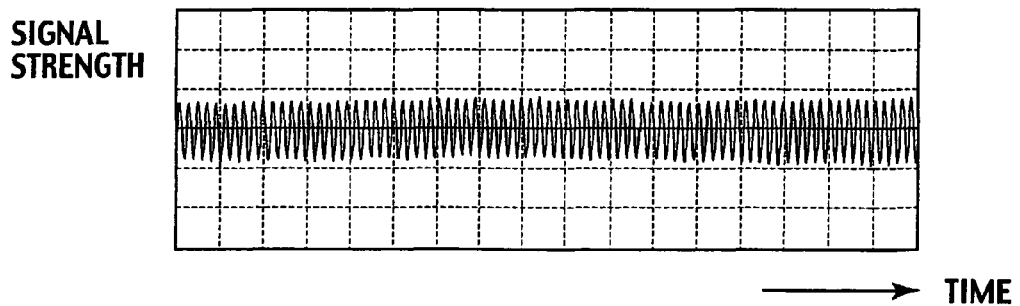

FIG. 22
(a)
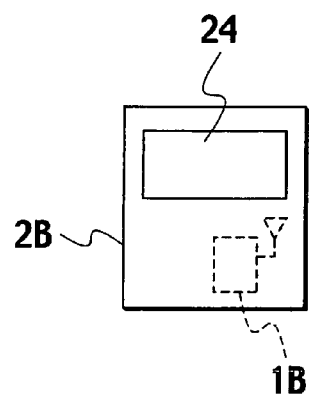
(b)
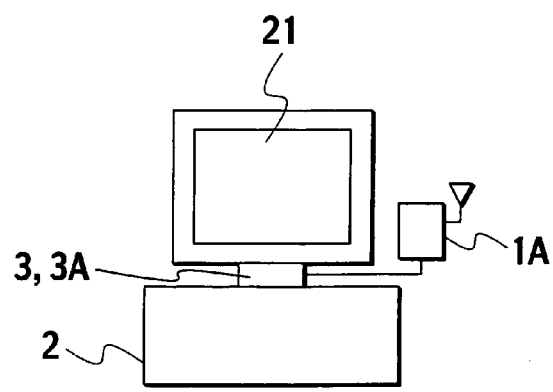
(c)
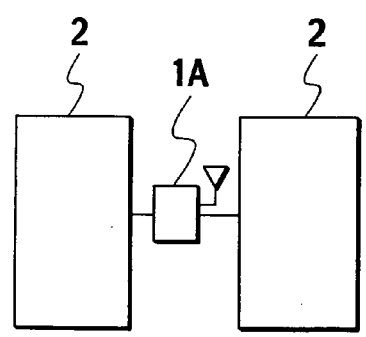

INFORMATION LEAKAGE PREVENTION APPARATUS AND INFORMATION LEAKAGE PREVENTION METHOD

TECHNICAL FIELD

The present invention relates to an information leakage prevention apparatus and an information leakage prevention method. In particular, it relates to an information leakage prevention apparatus and an information leakage prevention method capable of preventing a theft of image information related to image signals or other serial signals that are radiated as unwanted electromagnetic waves from an information equipment such as a computer or a communication equipment and are received and reproduced.

BACKGROUND ART

An information equipment such as a computer or a communication equipment unintentionally radiates unwanted electromagnetic waves, which have been produced from electric signals generated inside the information equipment or an interface connecting the information equipment to another. The unwanted electromagnetic waves contain information processed inside the information equipment. If a kind of the information interface can be clarified, we can reproduce the information by receiving the unwanted electromagnetic waves.

FIG. 1 is a view showing an example of a circuit for generating analog R, G, and B signals that are typical image signals processed with a computer.

The analog RGB signal generation circuit 100 shown in FIG. 1 has a vertical synchronization signal generator 101 to generate a vertical synchronization signal, an N-times frequency multiplier 102 to multiply the frequency of the vertical synchronization signal from the vertical synchronization signal generator 101 by N, a horizontal synchronization signal generator 103 to generate a horizontal synchronization signal based on the signal from the N-times frequency multiplier 102, an N-times frequency multiplier 104 to multiply the frequency of the horizontal synchronization signal from the horizontal synchronization signal generator 103 by N, a dot clock signal generator 105 to generate a dot clock signal based on the signal from the N-times frequency multiplier 104, a video RAM 106 to store R, G, and B image data, and analog modulators 107, 108, and 109 to modulate dot clock signals generated by the dot clock signal generator 105 according to R, G, and B (red, green, and blue) image data from the video RAM 106.

The RGB signal generation circuit 100 outputs the vertical synchronization signal V, horizontal synchronization signal H, and R, G, and B signals, as shown in FIG. 2. FIG. 2 shows examples of the vertical synchronization signal V, horizontal synchronization signal H, and R, G, and B signals. A signal to be displayed as image information is, as shown in FIG. 2, an analog signal representative of the brightness levels of dots, and each period of a brightness string corresponds to each period of the dot clock signal.

There are a variety of image resolution standards such as CGA, EGA, VGA, SVGA, QVGA, XGA, WXGA, SXGA, and UXGA. An image information transmission electric signal based on such a standard has periodicity and includes the above-mentioned synchronization signals. Accordingly, by utilizing the periodicity, a third person can illicitly steal image information from electromagnetic waves produced from the image information transmission electric signal.

FIG. 3 is a view showing an example of a reproduction apparatus used to illicitly steal image information. The reproduction apparatus 200 shown in FIG. 3 has an antenna 201, an amplifier/attenuator (AMP/ATT) 202 to, for example, amplify a signal from the antenna 201, a receiver 203 to carry out a filtering process and the like, an amplifier 204 to amplify a signal from the receiver 203, a limiter 205 to limit the amplitude of a signal from the amplifier 204, a vertical synchronization signal generator 207 to generate a vertical synchronization signal, a horizontal synchronization signal generator 208 to generate a horizontal synchronization signal, and a display to display R, G, and B signals from the limiter 205 in synchronization with the vertical synchronization signal and horizontal synchronization signal. The antenna 201 receives electromagnetic waves that are spontaneously generated by, for example, an interface line passing an image information signal. The reproduction apparatus 200 reproduces the image information signal from the received electromagnetic waves, thereby allowing a third person to unjustly steal image information.

FIG. 4 is a view showing another example of a reproduction apparatus. The reproduction apparatus 200A shown in FIG. 4 employs, instead of the limiter 205, display 206, vertical synchronization signal generator 207, and horizontal synchronization signal generator 208 of the reproduction apparatus 200 shown in FIG. 3, an AD converter 209 and a notebook personal computer 210 after an amplifier 204. In the reproduction apparatus 200A of this configuration, software inside the notebook personal computer 210 can detect synchronization signals, return a serial signal at intervals of the horizontal synchronization signal, and reproduce an image. The reproduction apparatus of this configuration can also steal image information.

An example of conventional techniques to prevent information leakage caused by leakage electromagnetic waves is shown in FIG. 5. This technique inserts a filter circuit 20 in an interface cable (such as a serial signal interface) connecting a computer 9 and a peripheral device 10 to each other, to suppress the levels of electromagnetic waves produced by the interface cable. This technique, however, is applicable only to a system employing an interface cable for connection. For example, an information system consisting of a desktop computer and a display includes an interface cable. A notebook personal computer having an integrated structure has no way to apply the technique. Since information itself is transmitted through the cable, it is impossible to surely remove the information from leakage electromagnetic waves. A filter provided for a casing having no shield is not always effective to reduce leakage electromagnetic waves.

FIG. 6 is a view explaining a conventional method of reducing leakage electromagnetic waves by providing a computer casing with an electromagnetic shield. This method may surely reduce electromagnetic waves. The shield, however, is expensive. In an information communication system, interface cables for information transmission must be arranged through the casing, and therefore, it is very difficult to establish a complete shield.

In these circumstances, there has been proposed a method of preventing information leakage by generating a false signal. For example, FIG. 7(a) shows a method of forming a mask signal serving as a false signal, to mask R, G, and B signals to be transmitted (refer to, for example, Japanese Unexamined Patent Application Publication No. Hei-5-151114). FIG. 8 shows a method of randomly delay R, G, and B signals (refer to, for example, Japanese Unexamined Patent Application Publication No. Hei-6-83296).

Radiated electromagnetic waves, however, have signal patterns close to differential components (di/dt) of R, G, and B current signals or differential components (dv/dt) of R, G, and B voltage signals. Accordingly, temporal changes of actual leakage electromagnetic waves will be as shown in FIG. 7(b). With the mask signal of FIG. 7(a), the actual leakage electromagnetic waves will provide a combinational waveform of FIG. 7(c). Despite the mask signal, the original signals are reproducible with a proper filter or integration circuit.

Generating a random false signal like the method of FIG. 8 deteriorates the S/N ratio of a receiver to make it difficult to reproduce signals. Signals, however, become reproducible with a reproduction apparatus 200 shown in FIG. 9. The reproduction apparatus 200B of FIG. 9 has a vertical synchronization signal generator 211 in addition to the reproduction apparatus 200A of FIG. 4. A synchronization signal generated by the vertical synchronization signal generator 211 is provided as a trigger signal to an A/D converter 209, so that a notebook personal computer 210 may compute time averages or carry out an autocorrelation process based on a signal string of several frames, to remove the random components.

DISCLOSURE OF INVENTION

In consideration of such circumstances, an object of the present invention is to provide an information leakage prevention apparatus and information leakage prevention method of simple configuration capable of making leakage electromagnetic waves radiated from an information equipment hardly receivable and decodable from the outside.

In order to accomplish the object, a first aspect of the present invention provides an information leakage prevention apparatus comprising a clock signal extractor connected to an interface of an information equipment for processing an information signal, to extract a clock signal component from the information signal; a clock signal generator to generate a pseudo clock signal having an optional phase difference relative to the clock signal component extracted by the clock signal extractor; a prevention signal generator to generate, based on the pseudo clock signal generated by the clock signal generator, a leakage prevention signal having an electromagnetic wave strength stronger than electromagnetic waves radiated from the information signal; and a prevention signal output unit to output the leakage prevention signal generated by the prevention signal generator.

According to a second aspect of the present invention which is based on the first aspect, the prevention signal generator generates an "n"th-order differential signal (n being an integer) of the pseudo clock signal and uses the generated differential signal as the leakage prevention signal.

According to a third aspect of the present invention which is based on the first aspect, the prevention signal generator generates an N-times periodic signal (N being an integer equal to or larger than 2) of the pseudo clock signal and uses the generated N-times periodic signal as the leakage prevention signal.

According to a fourth aspect of the present invention which is based on the third aspect, the prevention signal generator changes an offset position in an amplitude direction of the generated N-times periodic signal and uses the changed signal as the leakage prevention signal.

According to a fifth aspect of the present invention which is based on the third aspect, the prevention signal generator reduces a duty ratio of the pseudo clock signal and uses the obtained signal as the leakage prevention signal.

According to a sixth aspect of the present invention which is based on the fifth aspect, the prevention signal generator changes an offset position in an amplitude direction of the obtained signal and uses the changed signal as the leakage prevention signal.

According to a seventh aspect of the present invention which is based on the first aspect, the prevention signal output unit is an antenna arranged at a peripheral part of the information equipment.

According to an eighth aspect of the present invention which is based on the first aspect, the prevention signal output unit is an antenna arranged inside the information equipment.

According to a ninth aspect of the present invention which is based on the seventh or eighth aspect, the antenna can be one of a monopole antenna, a dipole antenna, a three-axis orthogonal dipole antenna, a loop antenna, a three-axis orthogonal loop antenna, a biconical antenna, and coils that can radiate electromagnetic wave.

According to a tenth aspect of the present invention which is based on the first aspect, the prevention signal output unit is a circuit pattern arranged at a peripheral part of the information equipment.

According to an eleventh aspect of the present invention which is based on the first aspect, the prevention signal output unit is a circuit pattern arranged inside the information equipment.

According to a twelfth aspect of the present invention which is based on the first aspect, the prevention signal output unit applies the leakage prevention signal to an internal circuit of the information equipment.

According to a thirteenth aspect of the present invention which is based on the first aspect, the prevention signal output unit applies the leakage prevention signal to a metal casing of the information equipment.

According to a fourteenth aspect of the present invention which is based on the first aspect, the prevention signal output unit applies the leakage prevention signal to a cable connected to the information equipment.

According to a fifteenth aspect of the present invention which is based on the fourteenth aspect, the prevention signal output unit is a conductor cable.

According to a sixteenth aspect of the present invention which is based on the fourteenth aspect, the prevention signal output unit is a current probe.

According to a seventeenth aspect of the present invention which is based on the first aspect, the information signal includes R, G, and B signals and horizontal/vertical synchronization signals, and the clock signal extractor extracts a dot clock signal.

According to an eighteenth aspect of the present invention which is based on the first aspect, the information signal includes R, G, and B signals and horizontal/vertical synchronization signals, and the clock signal generator generates the pseudo clock signal according to at least one of the R, G, and B signals.

According to a nineteenth aspect of the present invention, the apparatus based on the first aspect further comprises a distribution circuit arranged between the information equipment and the clock signal extractor and having an input/output interface to transmit the information signal from the information equipment to the clock signal extractor and an external interface to output the information signal to the outside.

In order to accomplish the above-mentioned object, a twentieth aspect of the present invention provides an information leakage prevention apparatus comprising a clock signal extractor connected to an interface of an information equipment for processing an information signal, to extract a clock signal component from the information signal; a clock signal generator to generate a pseudo clock signal having an optional phase difference relative to the clock signal component extracted by the clock signal extractor; a prevention signal generator to generate a leakage prevention signal according to the pseudo clock signal generated by the clock signal generator; an input/output unit to detect electromagnetic waves caused by the information signal and output the leakage prevention signal generated by the prevention signal generator; and a strength measuring unit to measure a strength of the electromagnetic waves detected by the input/output unit. The prevention signal generator generates the leakage prevention signal according to the electromagnetic wave strength measured by the strength measuring unit.

In order to accomplish the above-mentioned object, a twenty-first aspect of the present invention provides an information leakage prevention method comprising extracting a clock signal component from an information signal processed by an information equipment; generating a pseudo clock signal having an optional phase difference relative to the extracted clock signal component; generating, based on the generated pseudo clock signal, a leakage prevention signal having an electromagnetic wave strength stronger than electromagnetic waves leaking from the information signal; and outputting the generated leakage prevention signal.

BRIEF DESCRIPTION OF DRAWINGS

FIG. 7 is a view explaining a conventional method of preventing information leakage by generating a false signal.

FIG. 16 is a view explaining an effect of an information leakage prevention method according to the present invention applied to the reproduction apparatus of FIG. 4.

FIG. 22 is a view showing a concrete example according to the present invention.

BEST MODE FOR CARRYING OUT THE INVENTION

Information leakage prevention apparatuses and information leakage prevention methods according to embodiments of the present invention will be explained in detail with reference to the drawings.

First Embodiment

Figure 10:
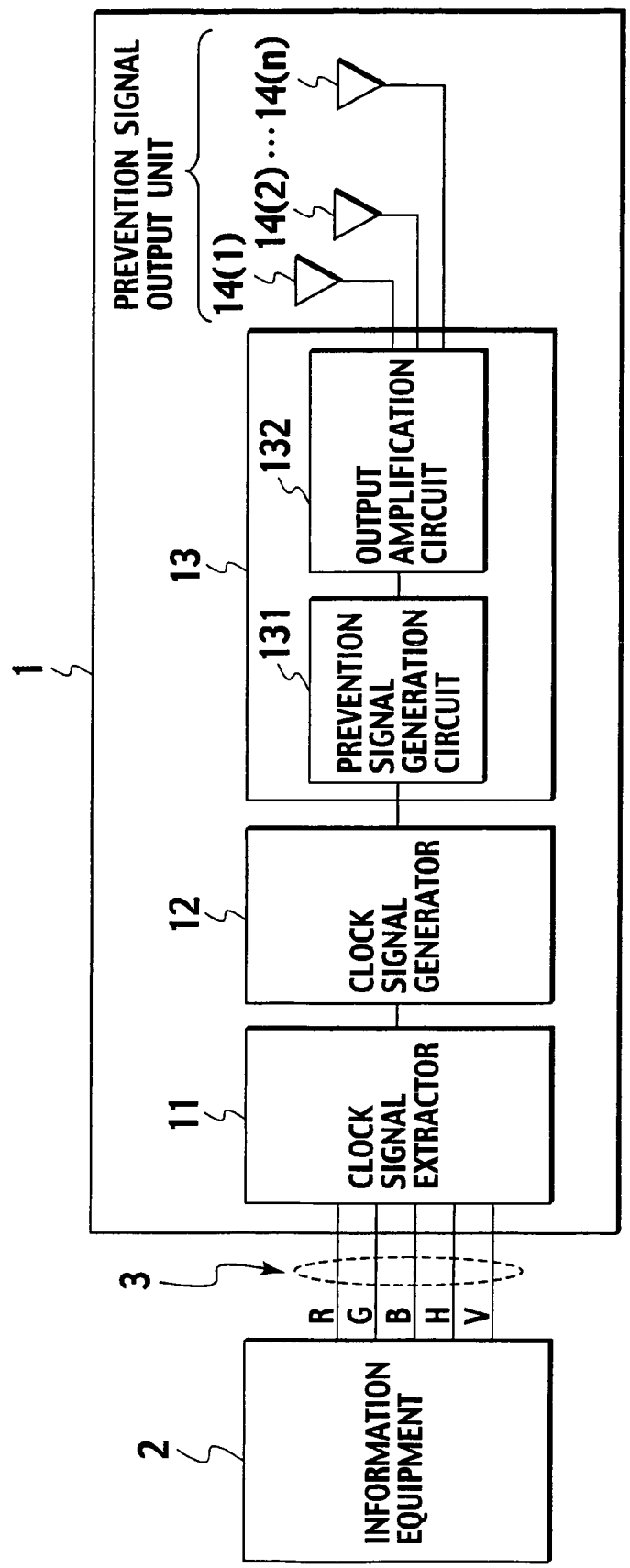
FIG. 10 is a view showing a configuration of an information leakage prevention apparatus according to a first embodiment of the present invention.
Figure 11:
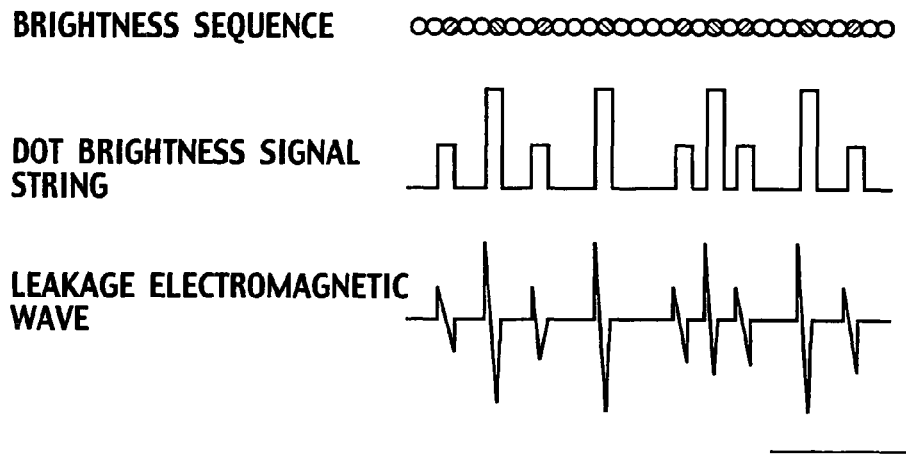
FIG. 11 is a view showing measured images of a brightness sequence, a dot brightness signal string, and electromagnetic waves generated by an RGB signal interface in an information equipment.

FIG. 10 is view showing a configuration of an information leakage prevention apparatus according to the first embodiment of the present invention. The information leakage prevention apparatus 1 shown in FIG. 10 is connected to an RGB signal interface 3 extending from an information equipment 2. FIG. 11 is a view showing measured images of a brightness sequence and a dot brightness signal string in the information equipment 2 and an electromagnetic wave generated by the RGB signal interface 3.

The information leakage prevention apparatus 1 shown in FIG. 10 has a clock signal extractor 11 to extract a dot clock serial signal from the RGB signal interface 3, a clock signal generator 12 to generate a pseudo clock signal, a prevention signal generator 13 to generate a leakage prevention signal according to the pseudo clock signal from the clock signal generator 12, and a prevention signal output unit 14 to output the leakage prevention signal. The prevention signal generator 13 consists of a prevention signal generation circuit 131 and an output amplification circuit 132.

Operation of each component of the information leakage prevention apparatus 1 will be explained.

The clock signal extractor 11 receives R, G, and B signals, a horizontal synchronization signal H, and a vertical synchronization signal V through the RGB signal interface 3 such as an external image signal port of the information equipment 2 such as a notebook personal computer and extracts a dot clock signal having a maximum frequency from among serial signals related to those signals. Instead of the serial dot clock signal, there may be a method of extracting a varying pattern of any one of the R, G, and B signals.

Next, the clock signal generator 12 generates a pseudo clock signal (pseudo clock signal A) synchronizing with the dot clock signal extracted by the clock signal extractor 11 or a pseudo clock signal (pseudo clock signal B) having a specified phase difference relative to the pseudo clock signal A and sends the generated pseudo clock signal to the prevention signal generator 13.

The prevention signal generation circuit 131 of the prevention signal generator 13 generates at least one of an "n"th-order differential signal (n being an integer) of the pseudo clock signal from the clock signal generator 12, an N-times periodic signal (N being an integer equal to or larger than 2) of the pseudo clock signal, a modified clock signal formed by reducing the duty ratio of the pseudo clock signal, and a signal formed by changing an offset position in an amplitude direction of the N-times periodic signal or duty-ratio-reduced signal of the pseudo clock signal.

A concrete example of the prevention signal generation circuit 131 is a differential circuit when generating a differential signal of the pseudo clock signal, or an N-times periodic circuit (N being an integer equal to or larger than 2) when generating an N-times periodic signal of the pseudo clock signal, or a duty ratio changing circuit when reducing the duty ratio of the pseudo clock signal. When generating a signal by shifting an offset position in an amplitude direction of the N-times periodic signal or duty-ratio-reduced signal of the pseudo clock signal, an offset circuit is employed in addition to the N-times periodic circuit or duty ratio changing circuit.

The output amplification circuit 132 of the prevention signal generator 13 adjusts the level of the signal provided by the prevention signal generation circuit 131 and sends the adjusted signal to the prevention signal output unit 14. The prevention signal output unit 14 outputs the leakage prevention signal provided by the prevention signal generator 13.

The prevention signal output unit 14 is, for example, at least one antenna or circuit pattern arranged at a peripheral part of the information equipment 2, to radiate electromagnetic waves. It may be a monopole antenna, a dipole antenna, a three-axis orthogonal dipole antenna, a loop antenna, a three-axis orthogonal loop antenna, a biconical antenna, a coil capable of emitting electromagnetic waves, or a conductor cable or circuit pattern serving as an antenna.

Radiating such a leakage prevention signal into a space makes it difficult to externally receive and decode leakage electromagnetic waves radiated from the information equipment 2 in various directions. The details of a principle of this will be explained later.

Another example of the prevention signal output unit 14 is a conductor cable connected to the information equipment 2. More precisely, the prevention signal output unit 14 may be a conductor cable wound around the RGB signal interface 3, power source line, or the like of the information equipment 2, a conductor cable arranged in parallel with the RGB signal interface 3, power source line, or the like of the information equipment 2, or a current probe arranged for the RGB signal interface 3, power source line, or the like of the information equipment 2.

By electromagnetically or electrostatically coupling the leakage prevention signal with a leakage electromagnetic wave radiating location of the information equipment 2, leakage electromagnetic waves will hardly be received and decoded from the outside.

The above-mentioned antennas, circuit patterns, and cables may be combined to serve as the prevention signal output unit 14.

The prevention signal output unit 14 may not be a discrete unit. For example, it may be a circuit pattern or an electronic element existing in the prevention signal generator 13, to simplify the structure.

Modification of First Embodiment

According to the first embodiment shown in FIG. 10, the prevention signal output unit 14 is included in the information leakage prevention apparatus 1. The prevention signal output unit 14 may be incorporated in the information equipment 2. For example, at least one antenna or circuit pattern may be arranged inside the information equipment 2. A metal casing of the information equipment 2 may function as the prevention signal output unit 14. A leakage prevention signal may directly be applied to an internal circuit of the information equipment 2 or the casing thereof.

By electromagnetically or electrostatically coupling a leakage prevention signal with a leakage electromagnetic wave radiating location of the information equipment 2, leakage electromagnetic waves will hardly be received and decoded from the outside.

Figure 12:
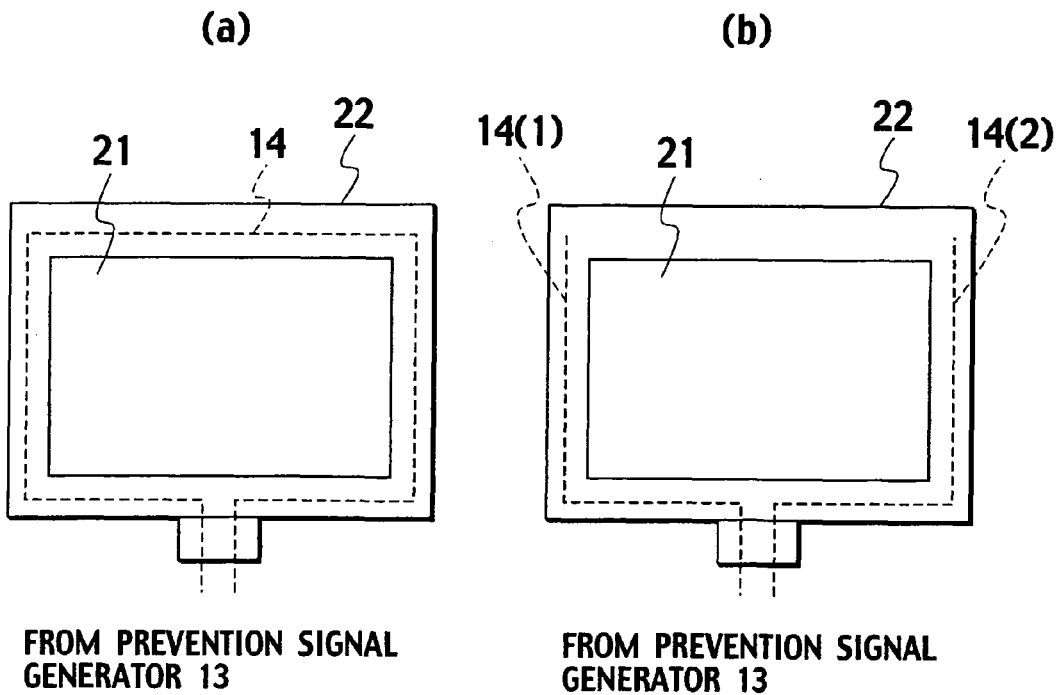
FIG. 12 is a view showing examples each with a prevention signal output unit incorporated in an information equipment.

FIGS. 12(a) and 12(b) show examples of the prevention signal output unit 14 incorporated in the information equipment 2. In FIG. 12(a), the prevention signal output unit 14 is arranged inside or at the surface of a frame 22 of a display 21 of the information equipment 2. In FIG. 12(b), the prevention signal output units 14(1) and 14(2) are arranged inside or at the surface of a frame 22 of a display 21 of the information equipment 2. In each case, the prevention signal output unit 14 may be a conductor cable serving as a loop antenna or a dipole antenna. Each example of FIGS. 12(a) and 12(b) arranges the prevention signal radiating antenna in the information equipment 2. This arrangement needs no separate space for the prevention signal output unit and can efficiently make leakage electromagnetic waves not receivable or not decodable from the outside.

Generally, there is a regulation to restrict the electric field strength of unwanted electromagnetic waves, to avoid interference with radio frequencies used for communication and broadcasting. The output level of a leakage prevention signal must be adjusted so that, when leakage electromagnetic waves from the information equipment 2 are received at a remote location, the output level exceeds an observed strength of leakage electromagnetic waves, and at the same time, does not exceed the regulated electric field strength.

Next, operation of the information leakage prevention apparatus 1 described above will be explained.

Figure 13:
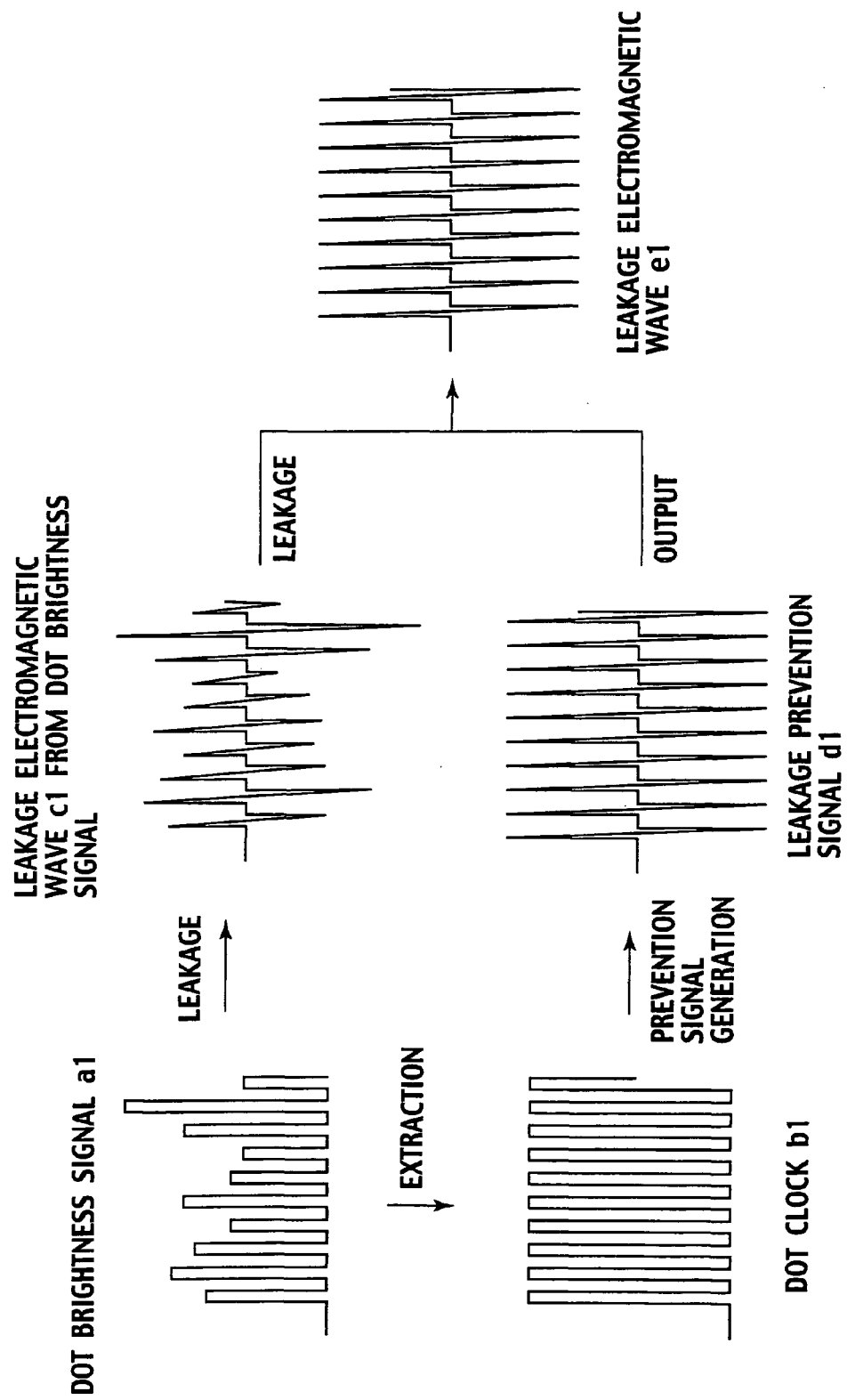
FIG. 13 is a view explaining an example employing a first-order differential circuit as a prevention signal generator.

FIG. 13 is a view explaining an example with the prevention signal generation circuit 131 being a first-order differential circuit. The clock signal extractor 11 of the information leakage prevention apparatus 1 extracts a dot clock signal string b1 from a dot brightness signal a1 obtained from the information equipment 2. Based on the dot clock signal extracted by the clock signal extractor 11, the clock signal generator 12 generates a pseudo clock signal. The prevention signal generation circuit 131 differentiates the pseudo clock signal and generates a leakage prevention signal d1.

On the other hand, the information equipment 2 radiates through the RGB signal interface 3 and power source line a leakage electromagnetic wave c1 due to a dot brightness signal, the leakage electromagnetic wave c1 being similar to a differential waveform of the dot brightness signal a1. Around the information equipment 2, the leakage prevention signal d1 is stronger than the leakage electromagnetic wave c1 (in terms of a maximum absolute strength in an optional time period, an average strength in an optional time period, or an average power strength in an optional time period). As a result, the leakage electromagnetic wave c1 is synthesized with the leakage prevention signal d1, so that the leakage prevention signal d1 is observed as a leakage electromagnetic wave e1. The leakage electromagnetic wave c1, therefore, becomes unable to be received and decoded. Although this example employs the first-order differential circuit, the same operation is simply achievable with a second- or higher-order differentiation. Instead of the dot clock signal, a varying pattern of any one of R, G, and B signal strings may be extracted and used.

Figure 14:
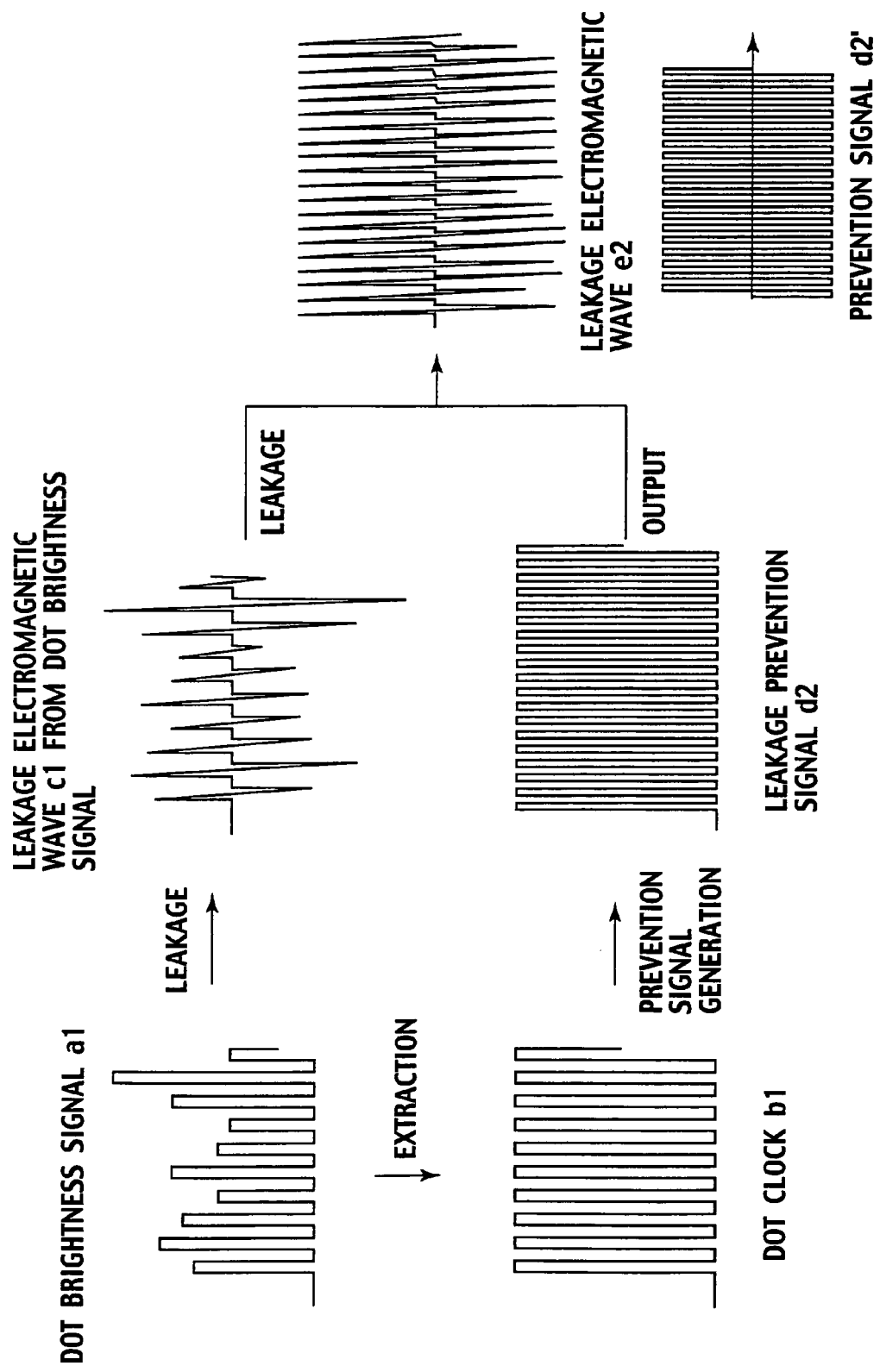
FIG. 14 is a view explaining an example employing an N-times periodic circuit (N being an integer equal to or larger than 2) as a prevention signal generator.

FIG. 14 is a view explaining an example with the prevention signal generation circuit 131 being an N-times periodic circuit (N being an integer equal to or larger than 2). Similar to the example shown in FIG. 13, the prevention signal generation circuit 131 multiplies the period of a pseudo clock signal generated by the clock signal generator 12 by N and provides a leakage prevention signal d2. Similar to the example shown in FIG. 13, the leakage prevention signal d2 around the information equipment 2 is stronger than a leakage electromagnetic wave c1. When the leakage electromagnetic wave c1 is synthesized with the leakage prevention signal d2, the leakage prevention signal d2 is observed as a leakage electromagnetic wave e2. Due to this, the leakage electromagnetic wave c1 becomes unable to be received and decoded.

A modification of this example may shift an offset position in an amplitude direction of the leakage prevention signal d2, to generate and provide a signal (signal d2' of FIG. 14) having positive and negative amplitudes. Another method may carry out a random number process on the offset-position-shifted signal, so that the amplitude of the signal may not always be alternated in positive and negative directions.

If the method of winding a conductor cable around the RGB signal interface 3 or the power source line of the information equipment 2, or the method of arranging a conductor cable in parallel with the RGB signal interface 3 or the power source line of the information equipment 2, or the method of arranging a current probe on the RGB signal interface 3 or the power source line of the information equipment 2 is employed to output a leakage prevention signal, i.e., if a dot brightness signal is suppressed before it is emitted into a space, the signal to be prevented from leakage is not a differential component of the original dot brightness signal but a signal component whose characteristic is close to that of an original signal. In consideration of, for example, a setting location of the information equipment 2, suppressing a dot brightness signal before it is emitted into a space will effectively be carried out by applying a dot clock signal itself or by applying a clock signal whose period is multiplied by 2 or larger like the example mentioned above.

Figure 15:
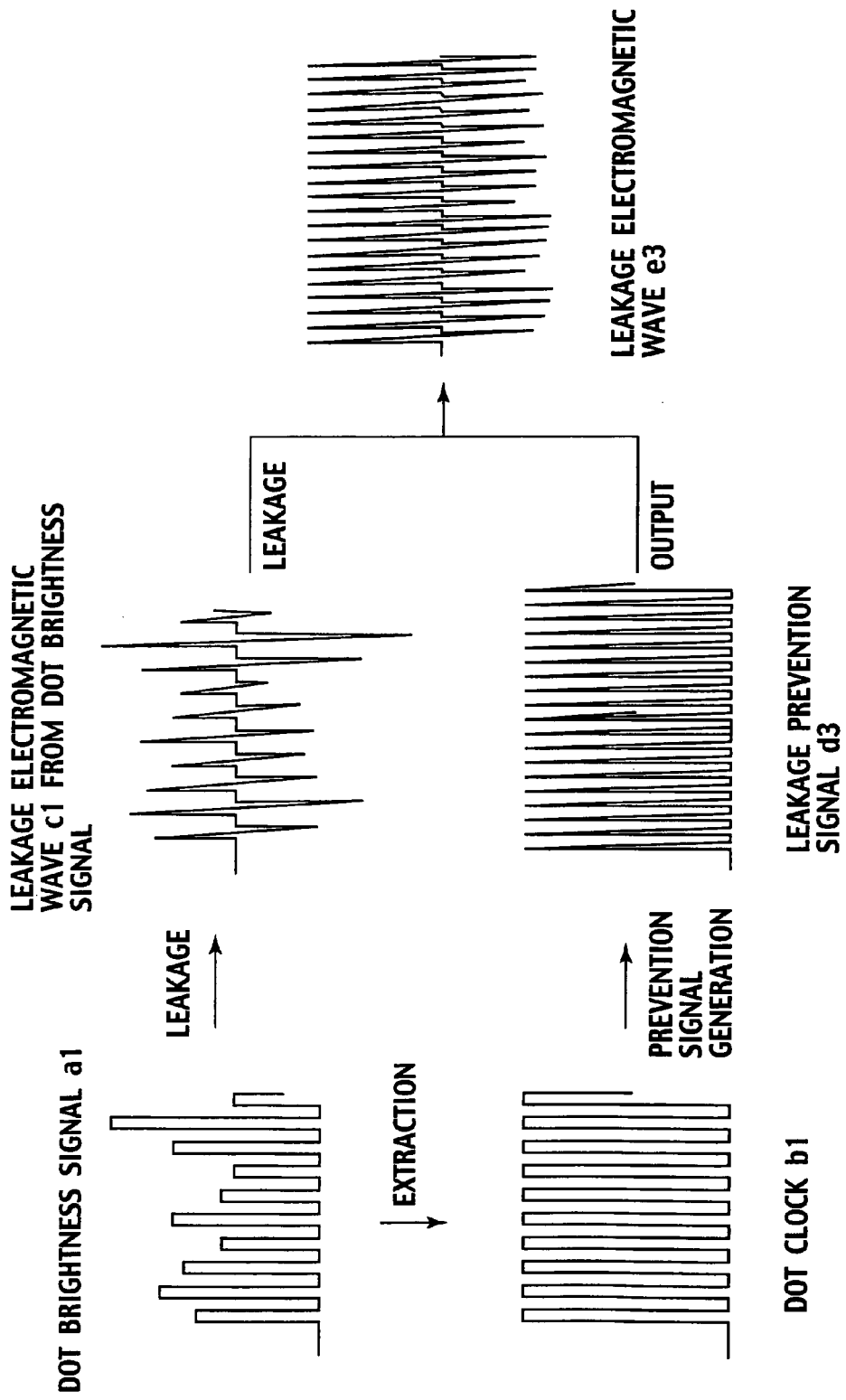
FIG. 15 is a view explaining an example employing a duty ratio changing circuit as a prevention signal generator.

FIG. 15 is a view showing an example with the prevention signal generation circuit 131 being a duty ratio changing circuit. Like the example shown in FIG. 13, the clock signal generator 12 generates a pseudo clock signal, and the prevention signal generation circuit 131 reduces the duty ratio of the pseudo clock signal and generates a leakage prevention signal d3. Reducing the duty ratio of a pseudo clock signal can generate a waveform similar to that generated by the differential circuit of FIG. 13, i.e., a waveform whose varying pattern is similar to that of a leakage electromagnetic wave radiated from the information equipment 2. Like the example shown in FIG. 13, the leakage prevention signal d3 is set to be stronger than the leakage electromagnetic wave c1 around the information equipment 2. When the leakage electromagnetic wave c1 is synthesized with the leakage prevention signal d3, the leakage prevention signal d3 is observed as a leakage electromagnetic wave e3, so that the leakage electromagnetic wave c1 becomes impossible to be received or decoded. This example involves a simple electronic circuit to realize the same effect as the example of FIG. 13.

This example is applicable to a method of shifting an offset position in an amplitude direction of the leakage prevention signal d3, to generate and output a signal having positive and negative amplitudes, or a method of carrying out a random number process so that the offset-position-shifted signal may not always have alternating positive and negative amplitudes.

It is possible to employ a random signal generation circuit to apply a signal having randomly changing patterns (white noise) to the leakage prevention signal shown in FIGS. 13 to 15 and generate a leakage prevention signal. This method may further disturb leakage electromagnetic waves radiated from the information equipment 2 so that they are not received and decoded at a remote location. In addition to applying a random signal, a modulator may be employed to apply frequency modulation to make a signal not to be decoded from the outside. The pseudo clock signal may not completely be synchronized with the original dot brightness signal a1. Instead, the pseudo clock signal may have a predetermined phase difference relative to the dot brightness signal a1. For example, with respect to a dot clock signal extracted by the clock signal extractor 11, the clock signal generator 12 may generate a pseudo clock signal having a phase difference of 180 degrees to suppress leakage electromagnetic waves radiated into a space.

Figure 4:
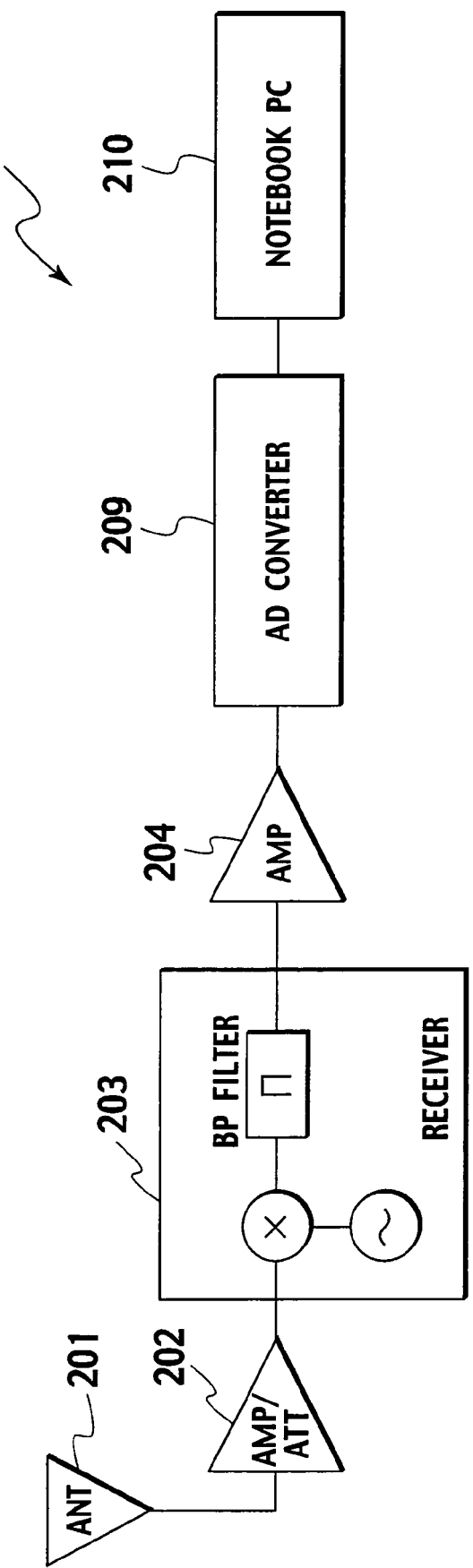
FIG. 4 is a view showing another example of a reproduction apparatus.
Figure 5:
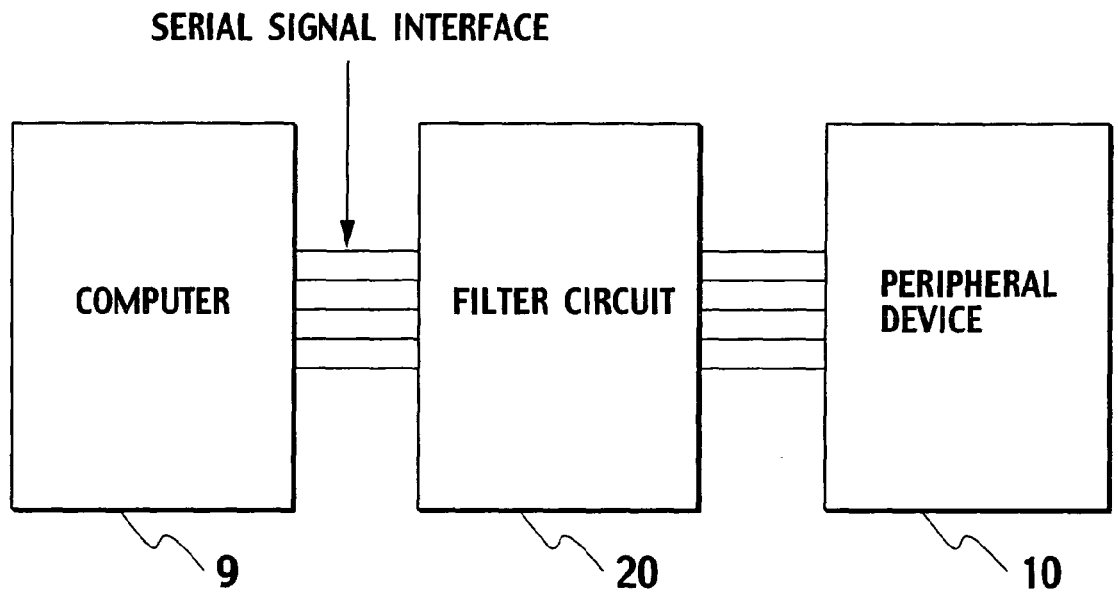
FIG. 5 is a view showing a conventional unit for preventing information leakage due to electromagnetic waves leaking from an interface cable.
Figure 6:
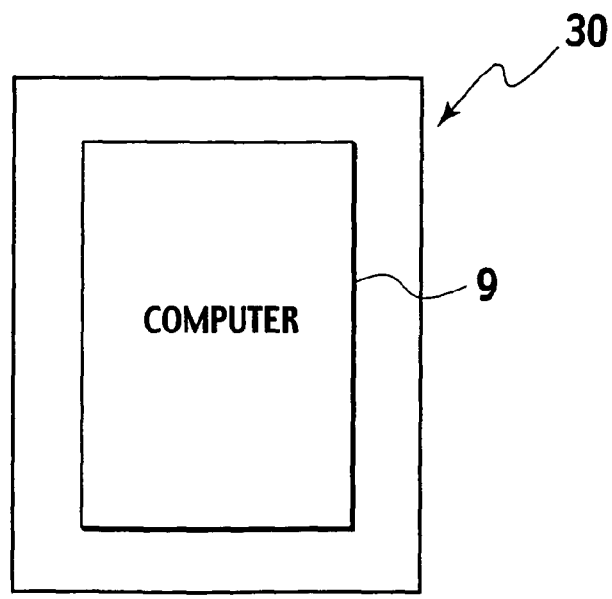
FIG. 6 is a view explaining a conventional method of reducing leakage electromagnetic waves with an electromagnetic shield applied to a casing of a computer.
Figure 8:
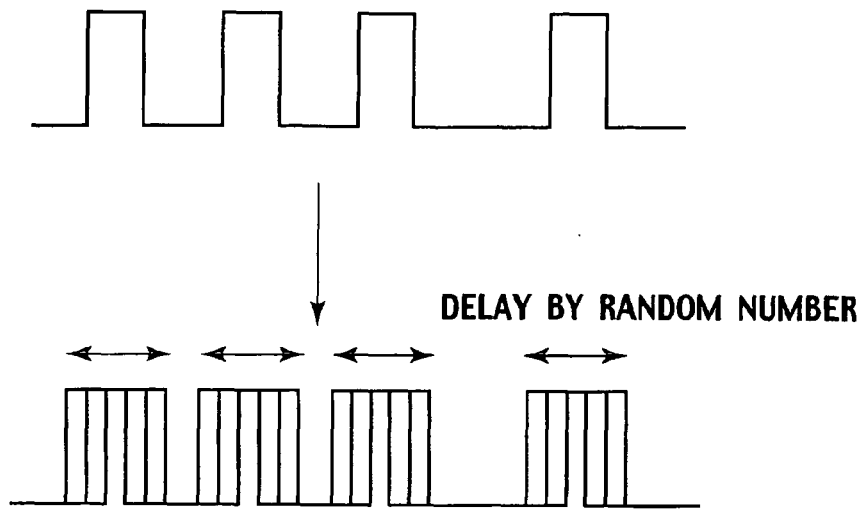
FIG. 8 is a view explaining a conventional method of preventing information leakage by generating a false signal.
Figure 9:
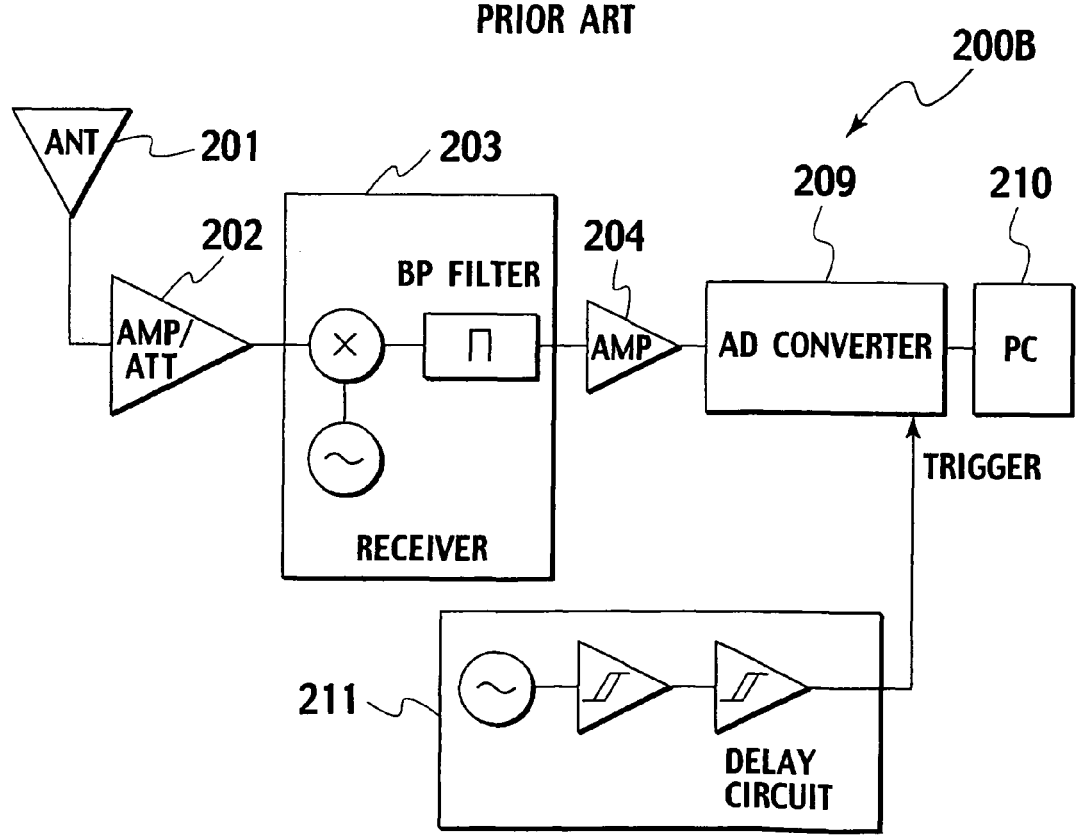
FIG. 9 is a view showing a configuration of a reproduction apparatus capable of illicitly obtaining information against the conventional information leakage prevention method of FIG. 8.

FIG. 16 is a view explaining an effect when the information leakage prevention method of the present invention is applied to the reproduction apparatus 200A shown in FIG. 4. In FIG. 16(a), the RGB signal interface 3 of the information equipment 2 is provided with an antenna to apply a leakage prevention signal, and the reproduction apparatus 200A reproduces a brightness signal string from leakage electromagnetic waves. In FIG. 16(b), the RGB signal interface 3 of the information equipment 2 is wound with a conductor cable to apply a leakage prevention signal, and the reproduction apparatus 200A reproduces a brightness signal string from leakage electromagnetic waves. In FIGS. 16(a) and 16(b), a division on an abscissa (time axis) corresponds to the width of an original dot clock signal. In each case, the brightness signal string substantially has constant strength changes to make it impossible to reproduce an image from the leakage electromagnetic waves. It is confirmed that the leakage prevention effect is achievable with various output forms of leakage prevention signals.

In this way, the information leakage prevention apparatus and information leakage prevention method according to the embodiments of the present invention extract a dot clock from a serial signal output port of the information equipment 2, generate a leakage prevention signal such as a differential component of a false clock, and output the leakage prevention signal in one of a variety of forms, to surely prevent a third person from receiving unwanted electromagnetic waves radiated from an information communication apparatus such as a computer or a communication equipment and illicitly reproducing original signals from the received waves.

In particular, the embodiments of the present invention are effective for a notebook personal computer with a computer body integrated with a display without an interface. The embodiments employ simple circuit configurations to avoid a cost increase that may be involved when employing an electromagnetic shield.

Second Embodiment

Figure 17:
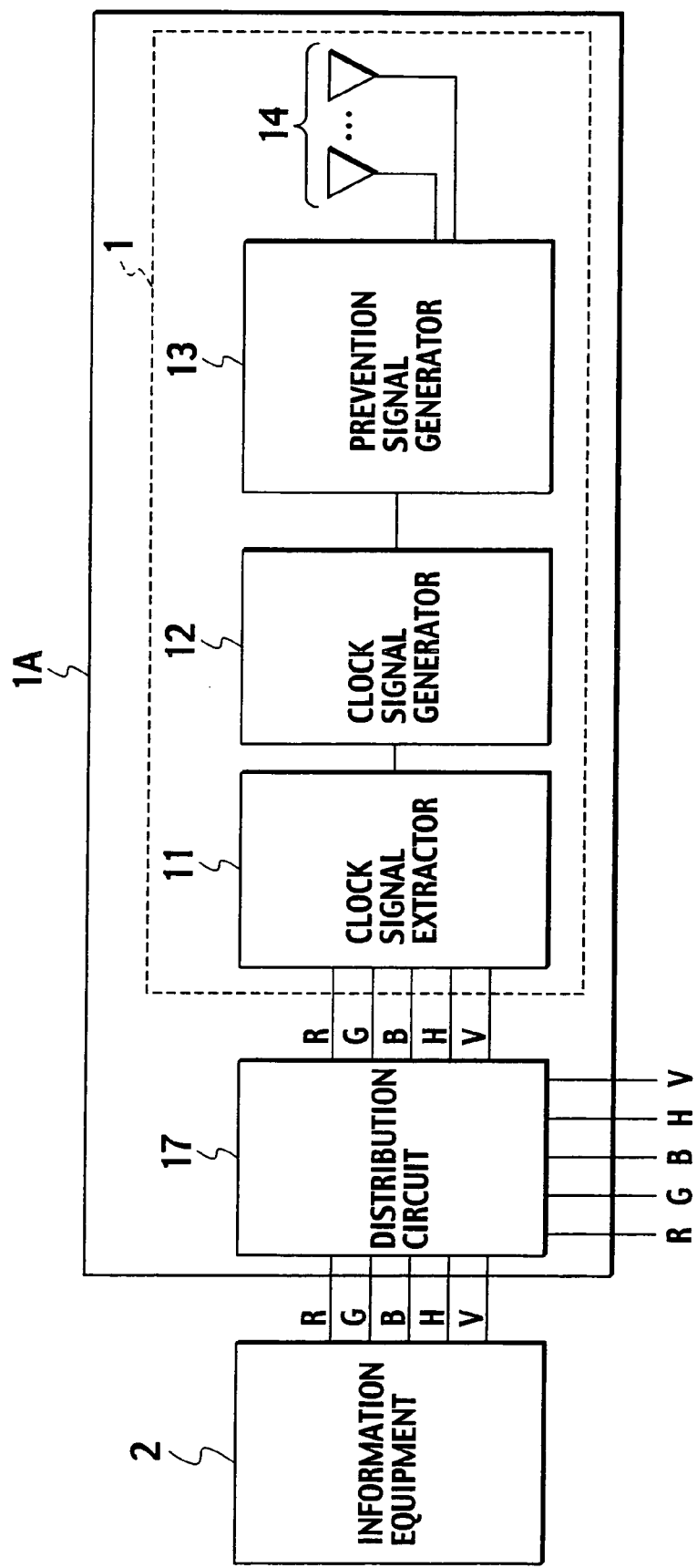
FIG. 17 is a view showing a configuration of an information leakage prevention apparatus according to a second embodiment of the present invention.

FIG. 17 is a view showing an information leakage prevention apparatus according to the second embodiment of the present invention. In FIG. 17, the same components as those of the information leakage prevention apparatus shown in FIG. 10 are represented with the same reference marks and their explanations are omitted.

The information leakage prevention apparatus 1A according to the second embodiment additionally has a distribution circuit 17 compared with the information leakage prevention apparatus 1 according to the first embodiment. Namely, the embodiment shown in FIG. 17 is applied to, for example, a desktop computer having a computer proper (information equipment 2) and a display that is separated from the computer proper. Interposed between the information equipment 2 and the display is the distribution circuit 17. The configuration of FIG. 17 makes leakage electromagnetic waves radiated from the information equipment 2 that is independent of the display not receivable nor decodable.

Third Embodiment

Figure 18:
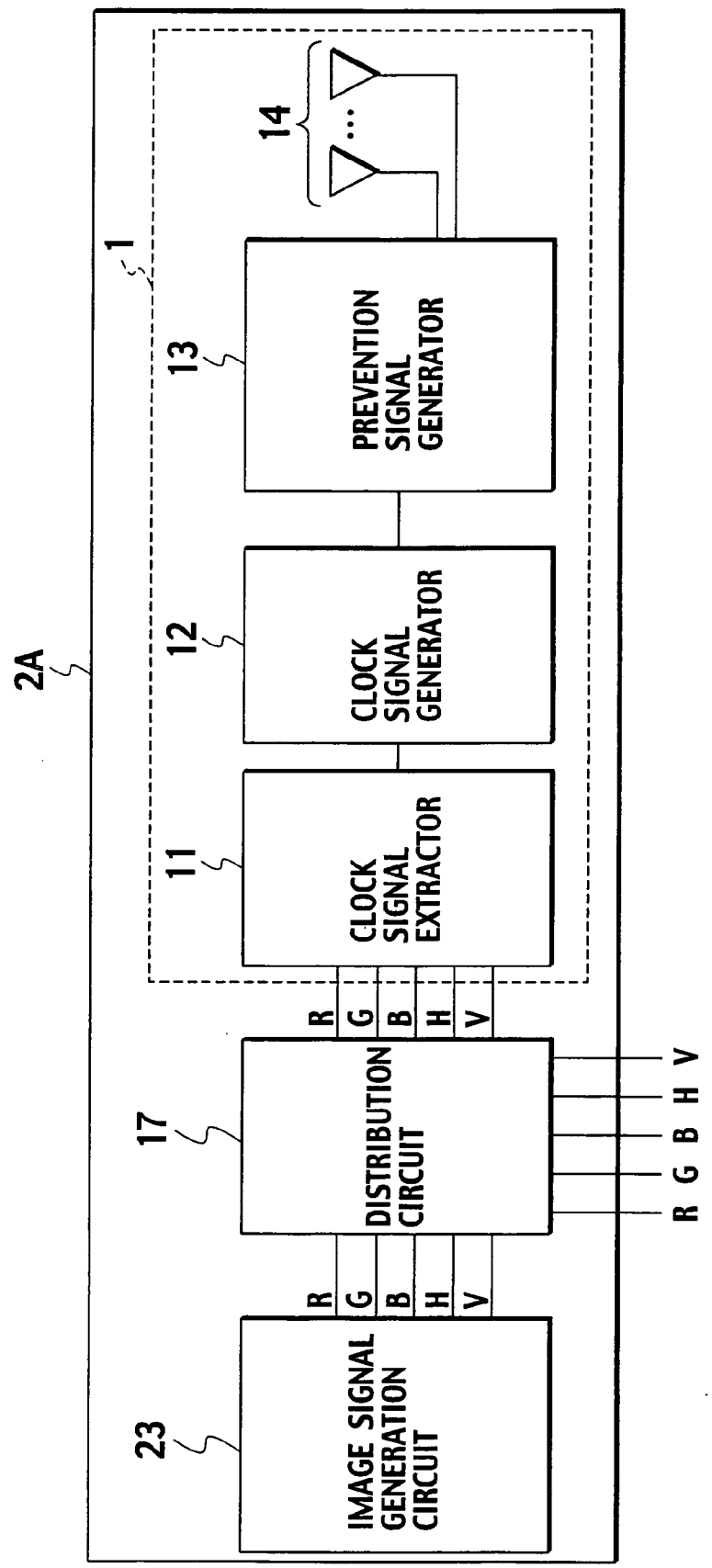
FIG. 18 is a view showing a configuration of an information leakage prevention apparatus according to a third embodiment of the present invention.

FIG. 18 is a view showing a configuration of an information leakage prevention apparatus according to the third embodiment of the present invention. In FIG. 18, the same components as those of the information leakage prevention apparatuses shown in FIGS. 10 and 17 are represented with the same reference marks and their explanations are omitted.

This embodiment incorporates the information leakage prevention apparatus 1 shown in FIG. 10 (the information leakage prevention apparatus 1A shown in FIG. 17) in an information equipment 2A. In this case, the information leakage prevention apparatus 1 (the information leakage prevention apparatus 1A) can obtain a dot clock signal from an image signal generation circuit 23. Instead of externally providing the information equipment 2 with an information leakage prevention apparatus, the same is incorporated in the information equipment 2, to realize the same effect.

Fourth Embodiment

Figure 1:
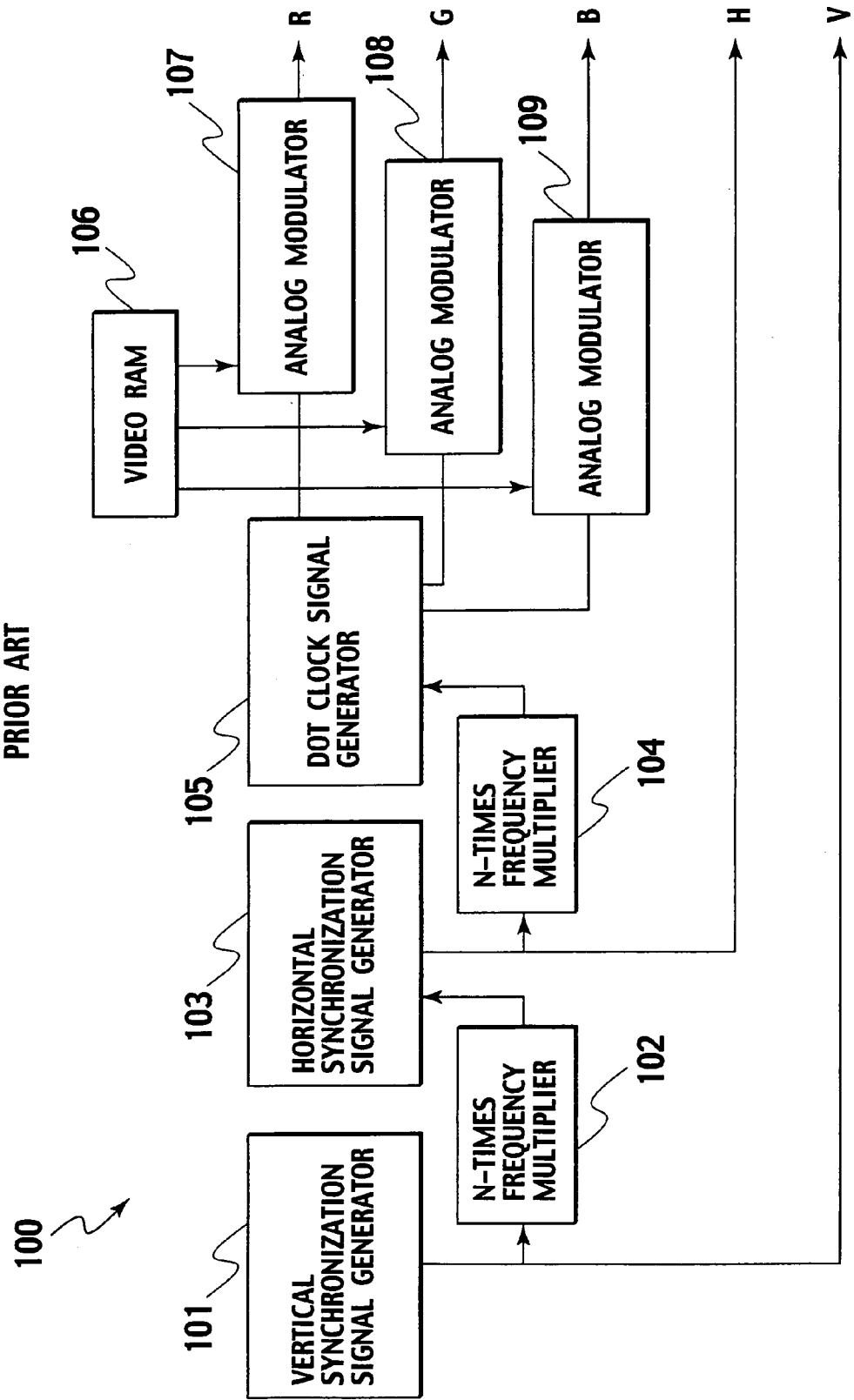
FIG. 1 is a view showing an example of a circuit for generating analog R, G, and B signals that are typical image signals processed with a computer.
Figure 2:
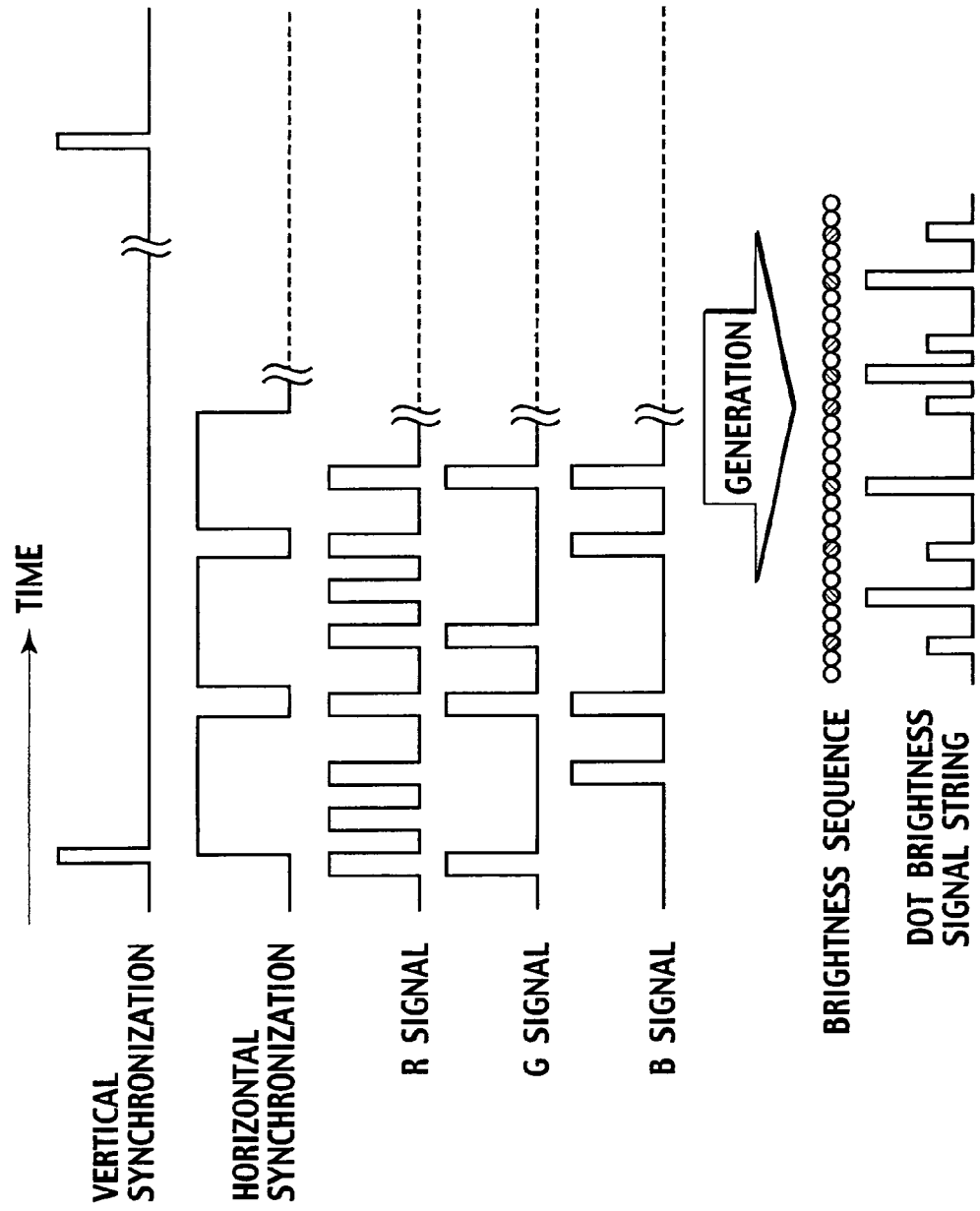
FIG. 2 is a view showing examples of vertical synchronization signal V, horizontal synchronization signal H, and R, G, and B signals.
Figure 3:
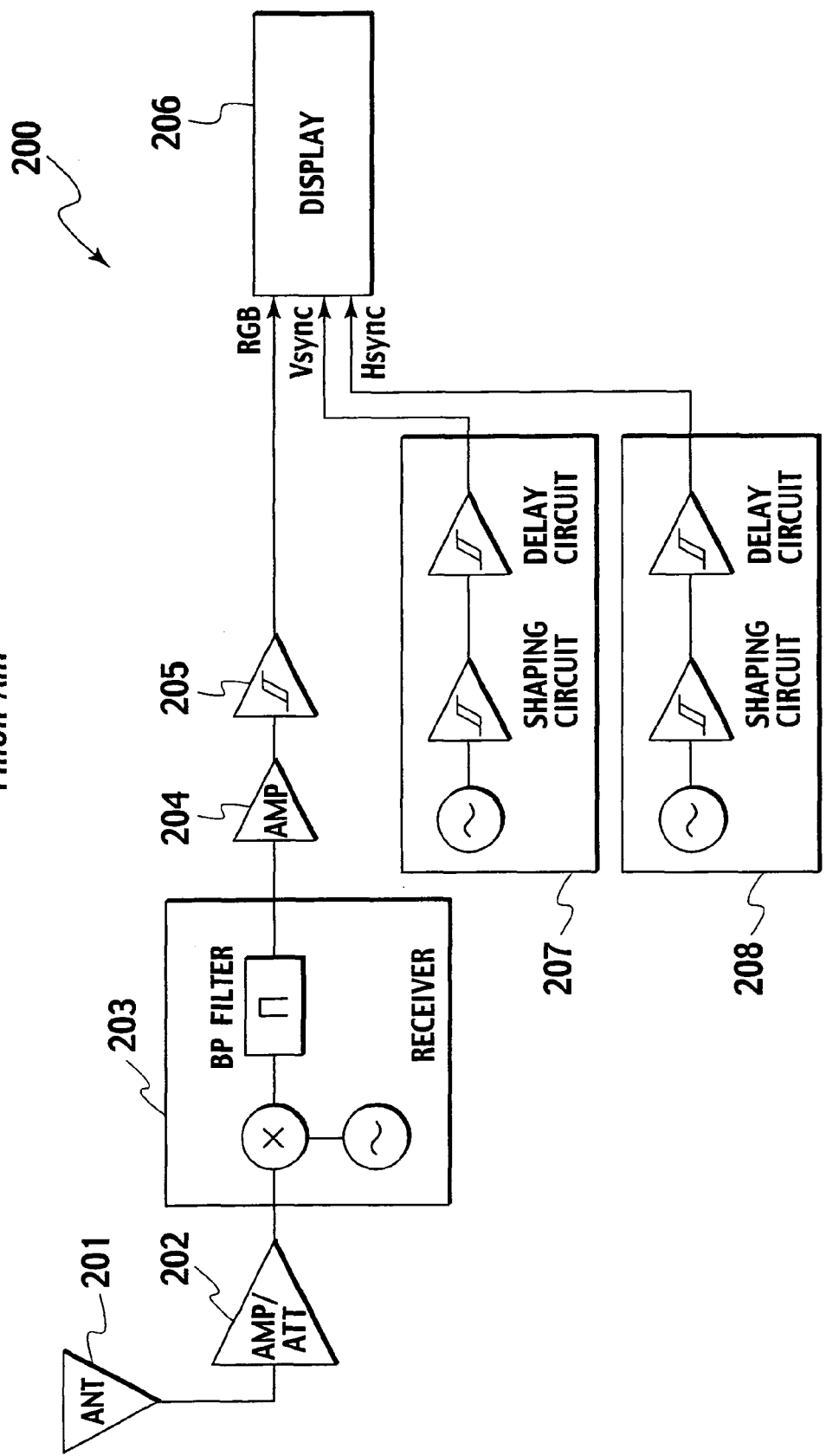
FIG. 3 is a view showing an example of a reproduction apparatus used to illicitly steal image information.
Figure 19:
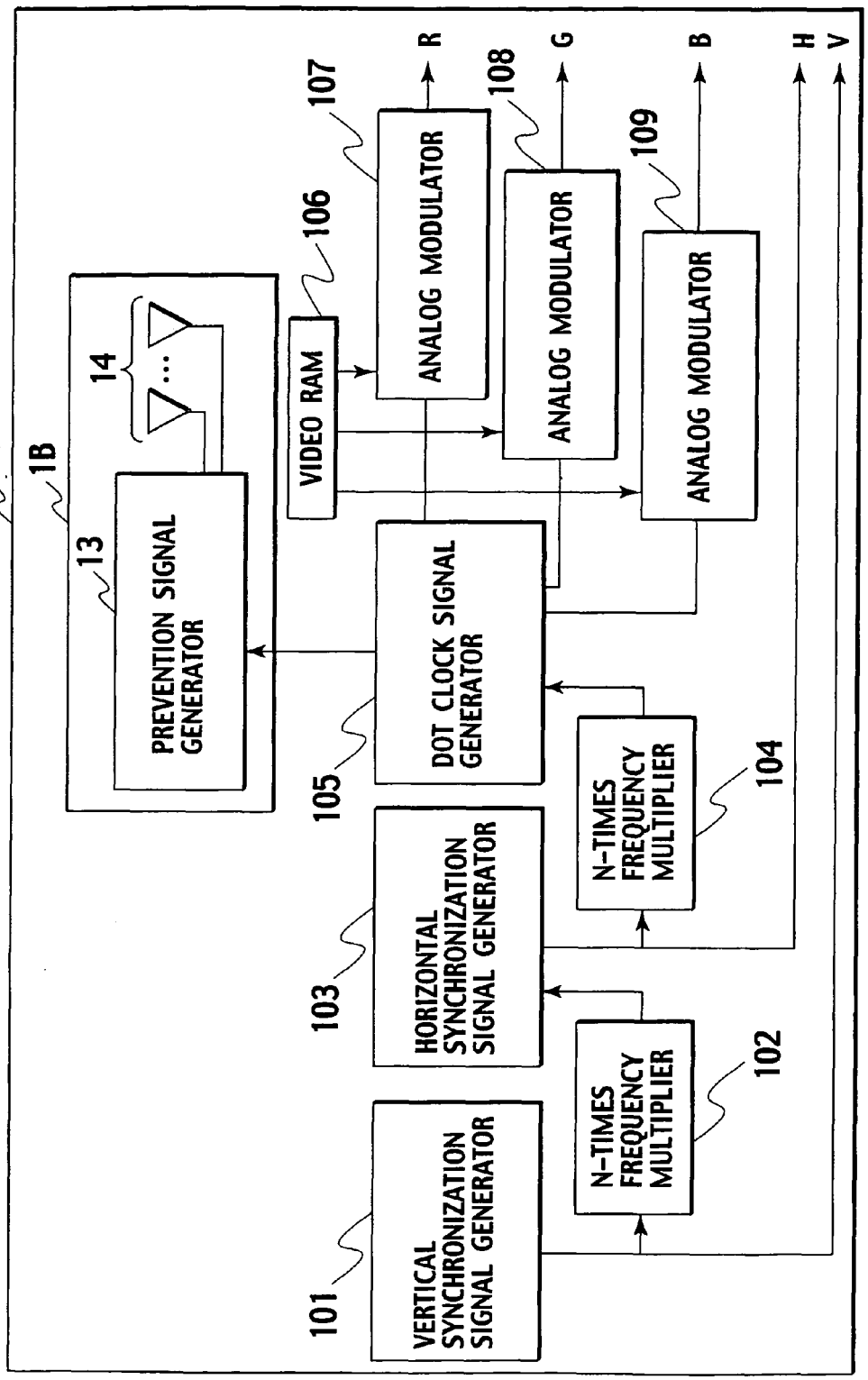
FIG. 19 is a view showing a configuration of an information leakage prevention apparatus according to a fourth embodiment of the present invention.

FIG. 19 is a view showing a configuration of an information leakage prevention apparatus according to the fourth embodiment of the present invention. In FIG. 19, the same components as those of the apparatuses shown in FIGS. 1 and 10 are represented with the same reference marks and their explanations are omitted.

Like the third embodiment, this embodiment incorporates the information leakage prevention apparatus in an information equipment. According to this embodiment, the information leakage prevention apparatus 1B does not have the clock signal extractor 11 and clock signal generator 12 and employs a dot clock signal sent from a dot clock signal generator 105 originally provided for the information equipment 2.

This embodiment directly obtains a dot clock signal from the information equipment which may be a computer, generates at least one of a differential signal of a pseudo clock signal, an N-times periodic signal (N being an integer equal to or larger than 2) of a pseudo clock signal, a signal formed by reducing the duty ratio of a pseudo clock signal, and a signal formed by changing an offset position in an amplitude direction of the N-times periodic signal or duty-ratio-reduced signal of a pseudo clock signal, and emits an electromagnetic wave leakage prevention signal from the inside of the information equipment. Consequently, this embodiment achieves an effect like that of the third embodiment.

Fifth Embodiment

Figure 20:
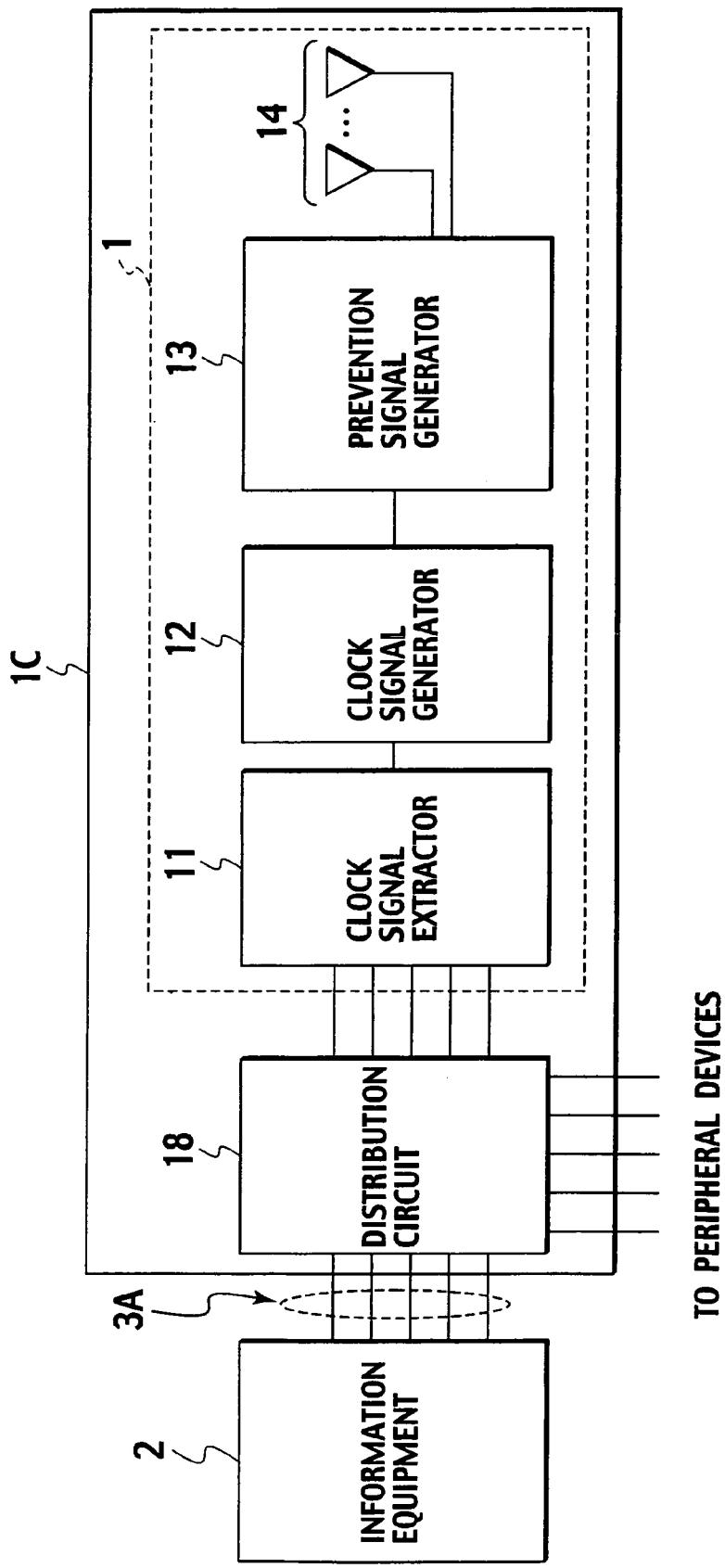
FIG. 20 is a view showing a configuration of an information leakage prevention apparatus according to a fifth embodiment of the present invention.

FIG. 20 is a view showing a configuration of an information leakage prevention apparatus according to the fifth embodiment of the present invention. In FIG. 20, the same components as those of the information leakage prevention apparatus shown in FIG. 17 are represented with the same reference marks and their explanations are omitted.

This embodiment is applicable not only to R, G, and B signals and horizontal/vertical synchronization signals but also to general serial signals for transmitting image information. For this, the information leakage prevention apparatus 1C is connected to an information equipment 2 through a serial signal interface (information signal interface) 3A. According to this embodiment, the information leakage prevention apparatus 1 has, instead of the distribution circuit 17, a distribution circuit 18 for general serial signals. Signals other than R, G, and B signals include component video signals, composite video signals, separate video signals, USB signals, Ethernet (registered trademark) signals, and the like containing image information. The distribution circuit 18 distributes serial signals of the information equipment 2 to the information leakage prevention apparatus 1 and external peripheral devices (printers, FAXes, video devices, and the like).

In this way, the information leakage prevention apparatus 1C according to this embodiment realizes the same effect for all serial signals for transmitting image information. Accordingly, this embodiment is widely usable for preventing information leakage from unwanted electromagnetic waves.

Sixth Embodiment

Figure 21:
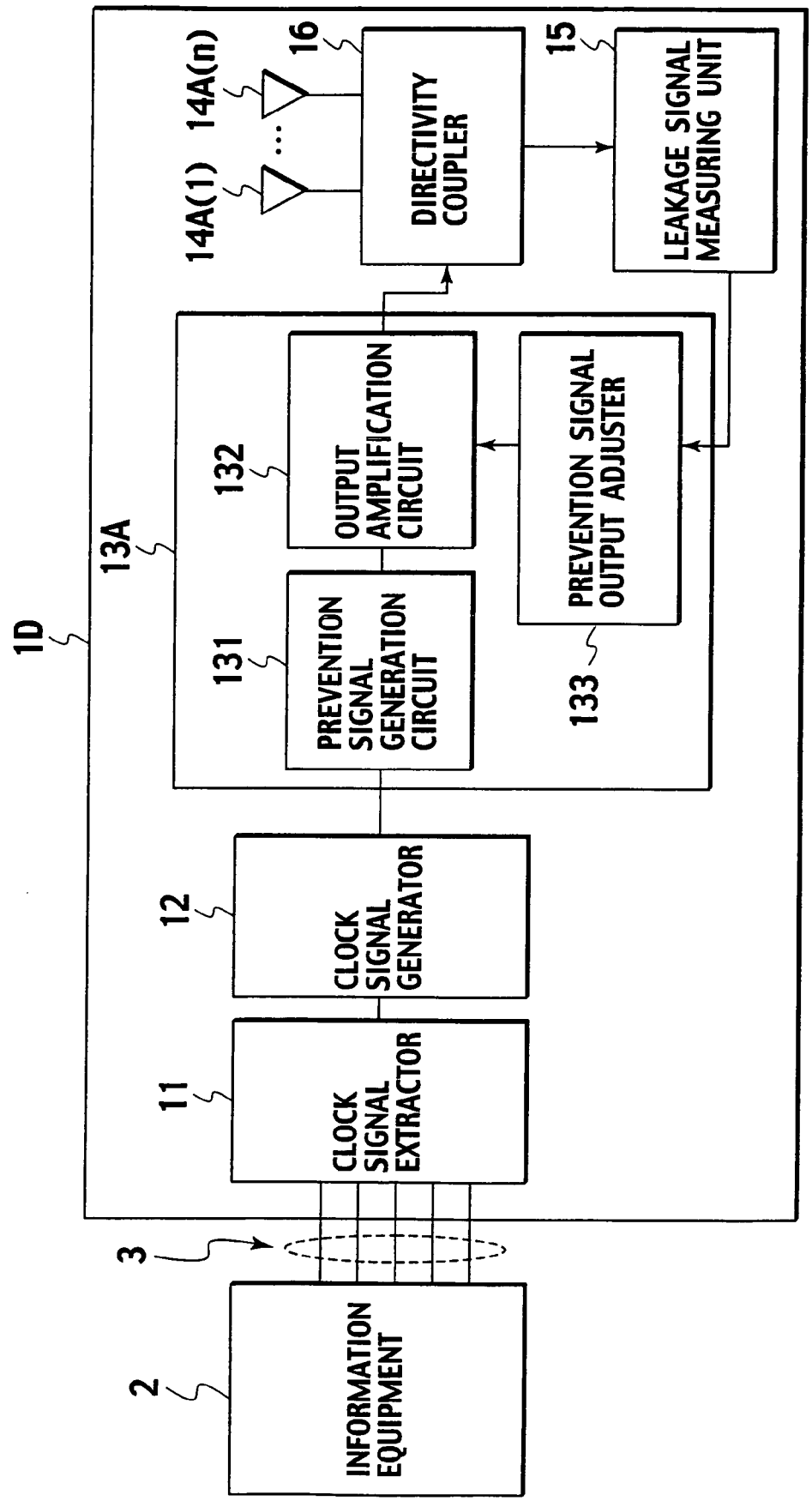
FIG. 21 is a view showing a configuration of an information leakage prevention apparatus according to a sixth embodiment of the present invention.

FIG. 21 is a view showing a configuration of an information leakage prevention apparatus according to the sixth embodiment of the present invention. In FIG. 21, the same components of the information leakage prevention apparatus shown in FIG. 10 are represented with the same reference marks and their explanations are omitted.

The information leakage prevention apparatus 1D according to this embodiment has a prevention signal generator 13A instead of the prevention signal generator 13 and a signal input/output unit 14A instead of the prevention signal output unit 14. The information leakage prevention apparatus 1D further has a leakage signal measuring unit 15 and a directivity coupler 16. The prevention signal generator 13A has, in addition to a prevention signal generation circuit 131 and an output amplification circuit 132, a prevention signal output adjuster 133.

The signal input/output unit 14A has a function of outputting a leakage prevention signal and a function of detecting leakage electromagnetic waves (electromagnetic waves radiated into a space) produced by an information equipment 2. Leakage electromagnetic waves detected by the signal input/output unit 14A are sent through the directivity coupler 16 to the leakage signal measuring unit 15. The leakage signal measuring unit 15 measures a strength (a maximum absolute strength in an optional time period, an average strength in an optional time period, an average electric power strength in an optional time period, or the like) of the input leakage electromagnetic waves and provides the prevention signal output adjuster 133 with a detected strength result. The prevention signal adjuster 133 outputs an adjust signal to the output amplification circuit 132 so that a leakage prevention signal may have an output strength stronger than the strength of the input leakage electromagnetic waves. The output amplification circuit 132 adjusts a gain according to the adjust signal.

For this adjustment, it is possible to select one of a method (a leakage prevention signal output level adjust method 1) of measuring an output level of leakage electromagnetic waves from the information equipment 2 before outputting a leakage prevention signal, and according to the result, determining an output level of the leakage prevention signal from the prevention signal generator 13A and a method (a leakage prevention signal output level adjust method 2) of measuring an output level of leakage electromagnetic waves from the information equipment 2, and at the same time, adaptively determining an output level of a leakage prevention signal.

This embodiment can easily set an output strength of a leakage prevention signal provided by the signal input/output unit 14A to be stronger than a strength of leakage electromagnetic waves from the information equipment 2 and can adjust a strength of electromagnetic waves radiated into a space to be lower than a specified level (such as a level specified by a regulation for electromagnetic waves emitted from an information equipment and the like). A combinational process achieved by the output amplification circuit 132 and prevention signal output adjuster 133 can be realized with, for example, an auto-gain controller. It is not always necessary to arrange the prevention signal output adjuster 133 inside the prevention signal generator 13A.

Although the present invention has been explained in connection with several embodiments, various modifications and changes may be made on the embodiments without departing from the spirit of the present invention. For example, not only the fifth embodiment but also the other embodiments may be expanded to handle general image information serial signals other than R, G, and B signals and horizontal/vertical synchronization signals.

In the last, concrete application examples of the present invention will be explained with reference to FIG. 22. In FIG. 22(a), an information equipment 2B has a display 24 and an information leakage prevention apparatus 1B. Namely, a discrete information equipment (for example, a notebook personal computer, a cellular phone, or a PDA terminal) is an objective of the present invention. In FIG. 22(b), an information equipment 2 is connected to a display 21 through an RGB interface 3, and an information leakage prevention apparatus 1A is arranged for the interface 3. A combination of the information equipment 2 and display 21 may be a combination of a computer and a video monitor, or a combination of a computer and a video projector. In FIG. 22(c), two information equipments 2 are connected to each other through an information leakage prevention apparatus 1A. A combination of the two information equipments 2 may be a combination of an information processor and a printer, a combination of an information processor and a facsimile, a combination of an information processor and a copy machine, or a combination of an information processor and a video unit. Information transmitted through these connections is efficiently protected by the information leakage prevention apparatus and information leakage prevention method of the present invention from being received and decoded by third persons.

INDUSTRIAL APPLICABILITY

The present invention can prevent unwanted electromagnetic waves radiated from an information communication device such as a computer, a communication equipment, a video projector, or the like from being received to reproduce image information by a third person at a remote location. The present invention is effective for a notebook personal computer integrated with a display without an image information interface cable. The present invention is realizable with a simple circuit structure without using, for example, an expensive shield. The present invention is applicable to all types of serial signals, and therefore, is versatile for preventing information leakage caused by leakage electromagnetic waves. The present invention can be assembled in advance in an information communication device such as a computer and can effectively prevent leakage electromagnetic waves radiated in various directions from being received and decoded at a remote location.

The invention claimed is:

1. An information leakage prevention apparatus comprising:
a clock signal extractor connected to an interface of an information equipment for processing an information signal, to extract a clock signal component from the information signal;
a clock signal generator to generate a pseudo clock signal having a specified phase difference relative to the clock signal component extracted by the clock signal extractor;
a prevention signal generator to generate, based only on the pseudo clock signal generated by the clock signal generator, an $n^{th}$-order differential signal of the pseudo clock signal, wherein integer $n \geq 2$, as a leakage prevention signal having an electromagnetic wave strength stronger than electromagnetic waves leaking from the information signal; and
a prevention signal output unit to output the leakage prevention signal generated by the prevention signal generator so that the leaked electromagnetic waves are not received and decoded at a remote location.

2. The information leakage prevention apparatus of claim 1, wherein the prevention signal output unit is an antenna arranged at a peripheral part of the information equipment.

3. The information leakage prevention apparatus of claim 2, wherein the antenna is one of a monopole antenna, a dipole antenna, a three-axis orthogonal dipole antenna, a loop antenna, a three-axis orthogonal loop antenna, a biconical antenna, and coils that can radiate electromagnetic wave.

4. The information leakage prevention apparatus of claim 1, wherein the prevention signal output unit is an antenna arranged inside the information equipment.

5. The information leakage prevention apparatus of claim 4, wherein the antenna is one of a monopole antenna, a dipole antenna, a three-axis orthogonal dipole antenna, a loop antenna, a three-axis orthogonal loop antenna, a biconical antenna, and coils that can radiate electromagnetic wave.

6. The information leakage prevention apparatus of claim 1, wherein the prevention signal output unit is a circuit pattern arranged at a peripheral part of the information equipment.

7. The information leakage prevention apparatus of claim 1, wherein the prevention signal output unit is a circuit pattern arranged inside the information equipment.

8. The information leakage prevention apparatus of claim 1, wherein the prevention signal output unit applies the leakage prevention signal to an internal circuit of the information equipment.

9. The information leakage prevention apparatus of claim 1, wherein the prevention signal output unit applies the leakage prevention signal to a metal casing of the information equipment.

10. The information leakage prevention apparatus of claim 1, wherein the prevention signal output unit applies the leakage prevention signal to a cable connected to the information equipment.

11. The information leakage prevention apparatus of claim 10, wherein the prevention signal output unit is a conductor cable.

12. The information leakage prevention apparatus of claim 10, wherein the prevention signal output unit is a current probe.

13. The information leakage prevention apparatus of claim 1, wherein the information signal includes R, G, and B signals and horizontal/vertical synchronization signals, and the clock signal extractor extracts a dot clock signal.

14. The information leakage prevention apparatus of claim 1, wherein the information signal includes R, G, and B signals and horizontal/vertical synchronization signals, and the clock signal generator generates the pseudo clock signal according to at least one of the R, G, and B signals.

15. The information leakage prevention apparatus of claim 1, further comprising a distribution circuit arranged between the information equipment and the clock signal extractor and having an input/output interface to transmit the information signal from the information equipment to the clock signal extractor and an external interface to output the information signal to the outside.

16. An information leakage prevention apparatus comprising:
 a clock signal extractor connected to an interface of an information equipment for processing an information signal, to extract a clock signal component from the information signal;
 a clock signal generator to generate a pseudo clock signal having a specified phase difference relative to the clock signal component extracted by the clock signal extractor;
 a prevention signal generator to generate an $n^{th}$-order differential signal of the pseudo clock signal, wherein integer $n \geq 2$, as a leakage prevention signal only according to the pseudo clock signal generated by the clock signal generator;
 an input/output unit to detect electromagnetic waves caused by the information signal and output the leakage prevention signal generated by the prevention signal generator; and
 a strength measuring unit to measure a strength of the electromagnetic waves detected by the input/output unit,
 the prevention signal generator generating the leakage prevention signal according to the electromagnetic wave strength measured by the strength measuring unit so that electromagnetic waves leaking from the information signal are not received and decoded at a remote location.

17. An information leakage prevention method comprising:
 configuring at least one processor or circuitry to perform the steps of:
  extracting a clock signal component from an information signal processed by an information equipment;
  generating a pseudo clock signal having a specified phase difference relative to the extracted clock signal component;
  generating, based only on the generated pseudo clock signal, an $n^{th}$-order differential signal of the pseudo clock signal, wherein integer $n \geq 2$, as a leakage prevention signal having an electromagnetic wave strength stronger than electromagnetic waves leaking from the information signal; and
  outputting the generated leakage prevention signal so that the leaked electromagnetic waves are not received and decoded at a remote location.

18. An information leakage prevention apparatus comprising:
 a clock signal extractor connected to an interface of an information equipment for processing an information signal, to extract a clock signal component from the information signal;
 a clock signal generator to generate a pseudo clock signal having a specified phase difference relative to the clock signal component extracted by the clock signal extractor;
 a prevention signal generator to generate, based only on the pseudo clock signal generated by the clock signal generator, an N-times periodic signal of the pseudo clock signal, wherein integer $N \geq 2$, as a leakage prevention signal having an electromagnetic wave strength stronger than electromagnetic waves leaking from the information signal; and
 a prevention signal output unit to output the leakage prevention signal generated by the prevention signal generator so that the leaked electromagnetic waves are not received and decoded at a remote location.

19. The information leakage prevention apparatus of claim 18, wherein the prevention signal generator changes an offset position in an amplitude direction of the generated N-times periodic signal and uses the changed signal as the leakage prevention signal.

20. An information leakage prevention apparatus comprising:
 a clock signal extractor connected to an interface of an information equipment for processing an information signal, to extract a clock signal component from the information signal;
 a clock signal generator to generate a pseudo clock signal having a specified phase difference relative to the clock signal component extracted by the clock signal extractor;
 a prevention signal generator to generate an N-times periodic signal of the pseudo clock signal, wherein integer $N \geq 2$, as a leakage prevention signal only according to the pseudo clock signal generated by the clock signal generator;
 an input/output unit to detect electromagnetic waves caused by the information signal and output the leakage prevention signal generated by the prevention signal generator; and
 a strength measuring unit to measure a strength of the electromagnetic waves detected by the input/output unit,
 the prevention signal generator generating the leakage prevention signal according to the electromagnetic wave strength measured by the strength measuring unit so that electromagnetic waves leaking from the information signal are not received and decoded at a remote location.

21. The information leakage prevention apparatus of claim 20, wherein the prevention signal generator changes an offset position in an amplitude direction of the generated N-times periodic signal and uses the changed signal as the leakage prevention signal.

22. An information leakage prevention apparatus comprising:
 a clock signal extractor connected to an interface of an information equipment for processing an information signal, to extract a clock signal component from the information signal;

a clock signal generator to generate a pseudo clock signal having a specified phase difference relative to the clock signal component extracted by the clock signal extractor;

a prevention signal generator to generate, based only on the pseudo clock signal generated by the clock signal generator, a signal obtained by reducing a duty ratio of the pseudo clock signal as a leakage prevention signal having an electromagnetic wave strength stronger than electromagnetic waves leaking from the information signal; and a prevention signal output unit to output the leakage prevention signal generated by the prevention signal generator so that the leaked electromagnetic waves are not received and decoded at a remote location.

23. The information leakage prevention apparatus of claim 22, wherein the prevention signal generator changes an offset position in an amplitude direction of the obtained signal and uses the changed signal as the leakage prevention signal.

24. An information leakage prevention apparatus comprising:

a clock signal extractor connected to an interface of an information equipment for processing an information signal, to extract a clock signal component from the information signal;

a clock signal generator to generate a pseudo clock signal having a specified phase difference relative to the clock signal component extracted by the clock signal extractor;

a prevention signal generator to generate a signal obtained by reducing a duty ratio of the pseudo clock signal as a leakage prevention signal only according to the pseudo clock signal generated by the clock signal generator;

an input/output unit to detect electromagnetic waves caused by the information signal and output the leakage prevention signal generated by the prevention signal generator; and a strength measuring unit to measure a strength of the electromagnetic waves detected by the input/output unit, the prevention signal generator generating the leakage prevention signal according to the electromagnetic wave strength measured by the strength measured by the strength measuring unit so that electromagnetic waves leaking from the information signal are not received and decoded at a remote location.

25. The information leakage prevention apparatus of claim 24, wherein the prevention signal generator changes an offset position in an amplitude direction of the obtained signal and uses the changed signal as the leakage prevention signal.

* * * * *

UNITED STATES PATENT AND TRADEMARK OFFICE
CERTIFICATE OF CORRECTION

PATENT NO. : 7,889,866 B2
APPLICATION NO. : 10/592717
DATED : February 15, 2011
INVENTOR(S) : Masugi et al.

It is certified that error appears in the above-identified patent and that said Letters Patent is hereby corrected as shown below:

On the title page item (73) Assignee: delete "Nippon Telegraph and Telephone Company (JP)" and insert -- Nippon Telegraph and Telephone Corporation (JP) --.

Signed and Sealed this
Twenty-sixth Day of July, 2011

David J. Kappos
*Director of the United States Patent and Trademark Office*